(12) United States Patent
Yamaguchi et al.

(10) Patent No.: US 6,547,046 B2
(45) Date of Patent: Apr. 15, 2003

(54) HYDRAULIC DAMPER

(75) Inventors: Hiroyuki Yamaguchi, Kanagawa (JP); Fumiyuki Yamaoka, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/805,242

(22) Filed: Mar. 14, 2001

(65) Prior Publication Data

US 2001/0023638 A1 Sep. 27, 2001

(30) Foreign Application Priority Data

Mar. 16, 2000 (JP) .................................. 2000-074838
Sep. 8, 2000 (JP) .................................. 2000-273402

(51) Int. Cl.$^7$ ............................................ F16F 9/36
(52) U.S. Cl. .................. 188/322.17; 188/322.18; 188/322.22
(58) Field of Search ............... 188/322.16, 322.17, 188/322.18, 280, 322.22

(56) References Cited

U.S. PATENT DOCUMENTS

| | | | | |
|---|---|---|---|---|
| 4,166,523 A | * | 9/1979 | Fujii et al. ............. | 188/322.17 |
| 4,881,723 A | * | 11/1989 | Bauer et al. ................ | 188/271 |
| 4,989,701 A | * | 2/1991 | Yamaoka et al. ....... | 188/322.17 |
| 5,174,551 A | * | 12/1992 | Mintgen ................ | 188/322.18 |
| 5,363,945 A | * | 11/1994 | Lizell et al. ........... | 188/322.17 |
| 6,173,960 B1 | | 1/2001 | Inose et al. | |

FOREIGN PATENT DOCUMENTS

| | | |
|---|---|---|
| DE | 27 16 927 A1 | 10/1978 |
| DE | 43 02 262 A1 | 8/1994 |
| DE | 199 24 534 A1 | 12/1999 |

* cited by examiner

*Primary Examiner*—Jack Lavinder
*Assistant Examiner*—Thomas J. Williams
(74) *Attorney, Agent, or Firm*—Foley & Lardner

(57) ABSTRACT

A hydraulic damper includes a friction member arranged inwardly with respect to a seal member and mounted to one of a cylinder and a piston rod. The friction member slidably contacts another of the cylinder and the piston rod to produce friction greater than that produced at the seal member.

23 Claims, 46 Drawing Sheets

FIG.1
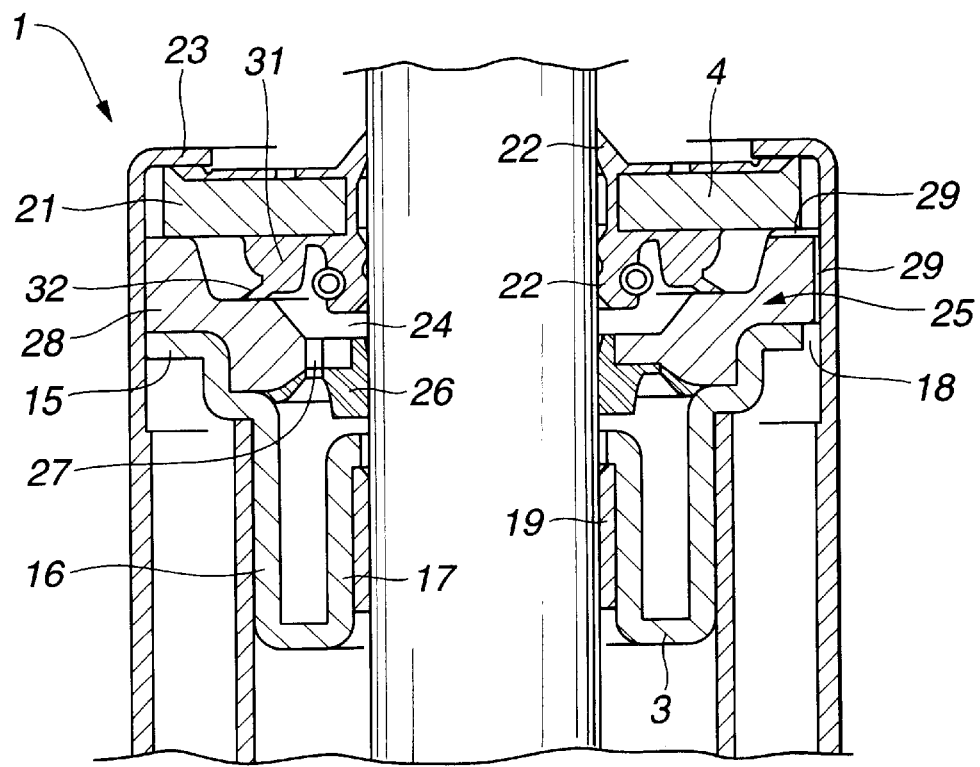
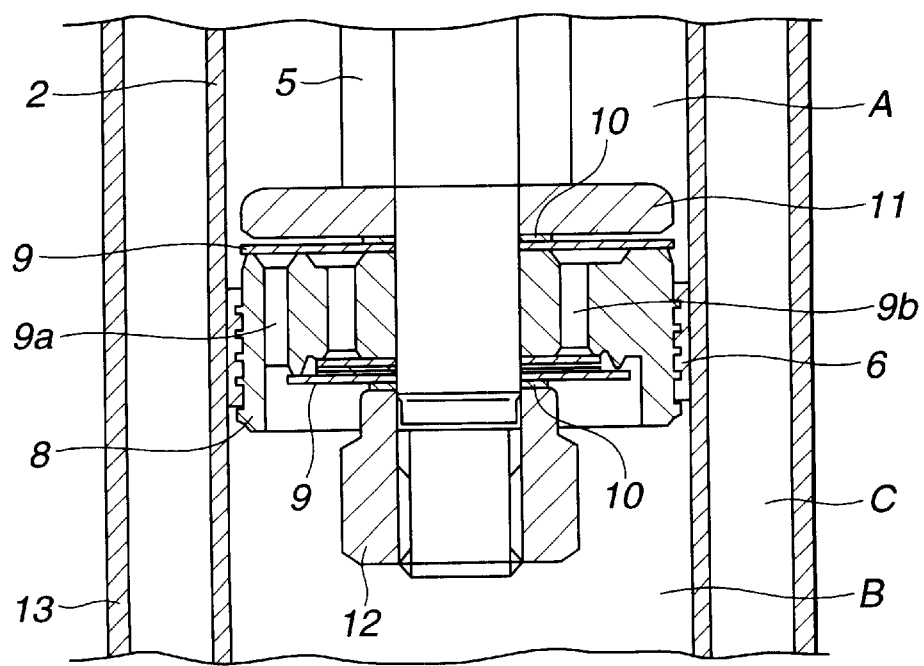

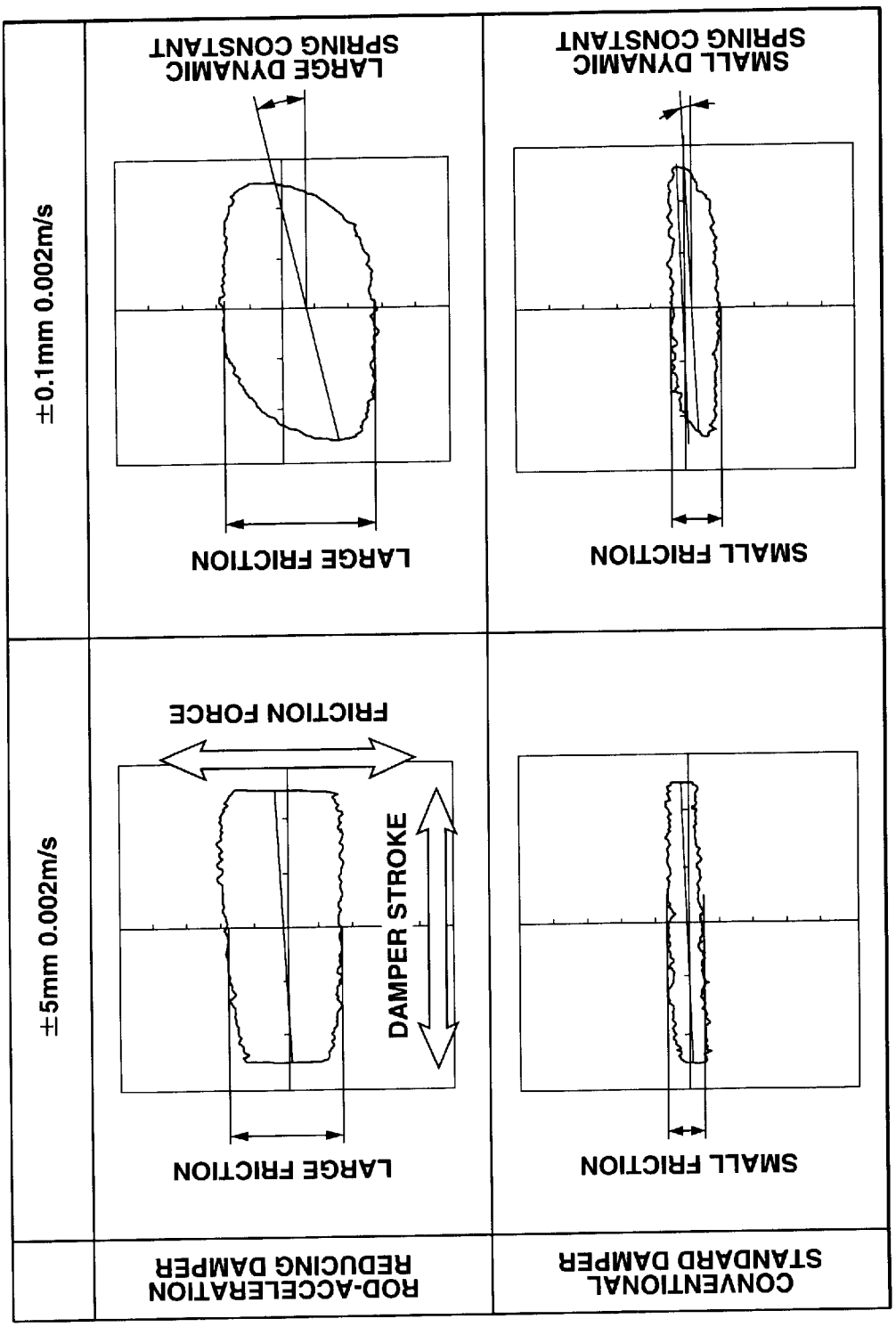

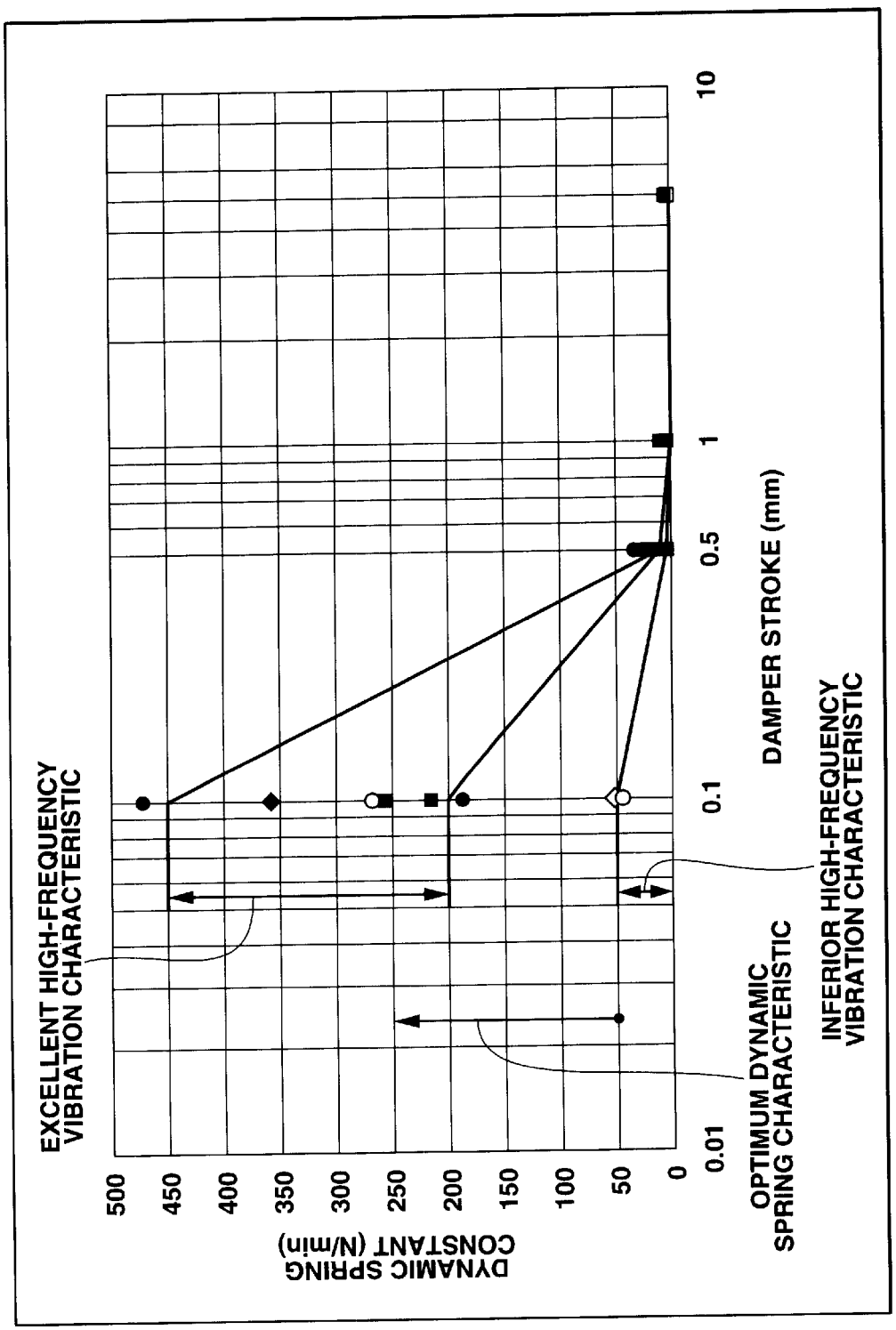

HYDRAULIC DAMPER

BACKGROUND OF THE INVENTION

The present invention relates, to a hydraulic damper for use in automotive suspension systems.

One of the hydraulic dampers of the type is disclosed, for example, in JP-A 10-141415. This hydraulic damper comprises an annular bush with a slit between a guide bush and a piston rod, and a coil spring arranged at the outer periphery of the bush to press the inner peripheral face of the bush against the piston rod, providing friction to rather low-speed movement of the piston rod.

However, the above hydraulic damper raises the following problem. The hydraulic damper aims to provide friction to rather low-speed movement of the piston rod, so that though received in a concavity formed in a rod guide with an axial clearance and axially retained by an anti-disengagement member covering the concavity, the bush is axially movable with respect to the rod guide due to presence of the clearance. Therefore, friction of the bush effectively operates on large-amplitude movement of the piston rod, but not on slight-amplitude movement or high-frequency vibrations since the bush moves axially together with the piston rod in within the clearance.

It is appreciated that control of slight-amplitude movement of the piston rod, e.g. high-frequency vibrations with amplitude of ±0.5 mm or less and frequency of 15 Hz or more, is one of the factors responsible for determination of the ride quality of automotive vehicles. However, the above hydraulic damper cannot reduce such high-frequency vibrations. Thus, there still remains a demand for a reduction both in low-frequency vibrations with rather low speed and large amplitude and in high-frequency vibrations.

SUMMARY OF THE INVENTION

It is, therefore, an object of the present invention to provide a hydraulic damper which contributes to an improvement in the ride quality of automotive vehicles by effectively reducing wide-ranging vibrations including high-frequency vibrations.

The present invention generally provides a hydraulic damper, comprising:
a cylinder filled with hydraulic fluid;
a piston slidably received in the cylinder through a piston ring;
a piston rod having one end mounted to the piston and another end extending outwardly of the cylinder;
a guide bush arranged on the side of the cylinder to slidably support the another end of the piston rod;
a seal member arranged outwardly with respect to the guide bush, the seal member slidably contacting the piston rod to prevent leakage of hydraulic fluid from the cylinder, the seal member comprising a lip portion; and
a friction member arranged inwardly with respect to the seal member, the friction member being mounted to one of the cylinder and the piston rod, the friction member slidably contacting another of the cylinder and the piston rod to produce friction greater than that produced at the seal member.

One aspect of the present invention is to provide a hydraulic damper, comprising:
a cylinder filled with hydraulic fluid;
a piston slidably received in the cylinder through a piston ring;
a piston rod having one end mounted to the piston and another end extending outwardly of the cylinder;
a guide bush arranged on the side of the cylinder to slidably support the another end of the piston rod;
a seal member arranged outwardly with respect to the guide bush, the seal member slidably contacting the piston rod to prevent leakage of hydraulic fluid from the cylinder, the seal member comprising a lip portion; and
a friction member arranged inwardly with respect to the seal member, the friction member being mounted to one of the cylinder and the piston rod, the friction member slidably contacting another of the cylinder and the piston rod to produce friction greater than that produced at the seal member, the friction member being arranged on the side of the cylinder in the vicinity of the guide bush to produce friction greater than that produced at the guide bush.

Another aspect of the present invention is to provide a hydraulic damper, comprising:
a cylinder filled with hydraulic fluid;
a piston slidably received in the cylinder through a piston ring;
a piston rod having one end mounted to the piston and another end extending outwardly of the cylinder;
a guide bush arranged on the side of the cylinder to slidably support the another end of the piston rod;
a seal member arranged outwardly with respect to the guide bush, the seal member slidably contacting the piston rod to prevent leakage of hydraulic fluid from the cylinder, the seal member comprising a lip portion; and
a friction member arranged inwardly with respect to the seal member, the friction member being mounted to one of the cylinder and the piston rod, the friction member slidably contacting another of the cylinder and the piston rod to produce friction greater than that produced at the seal member, the friction member is arranged on the side of the piston to produce friction greater than that produced at the piston ring.

BRIEF DESCRIPTION OF THE DRAWINGS

The other objects and features of the present invention will become apparent from the following description with reference to the accompanying drawings wherein:

FIG. 1 is an enlarged fragmentary section showing a first embodiment of a hydraulic damper according to the present invention;

FIG. 5 is a view similar to FIGS. 4A–4B, showing results of measurements for the friction characteristic with respect to the damper stroke for the domestic standard hydraulic damper and the European high-grade hydraulic damper;

FIG. 6 is a view similar to FIG. 5, illustrating a range of a real value of dynamic spring constant with respect to the damper stroke for a vehicle with excellent high-frequency vibration characteristic (i.e. with the European high-grade hydraulic damper);

DETAILED DESCRIPTION OF THE INVENTION

Figure 2:
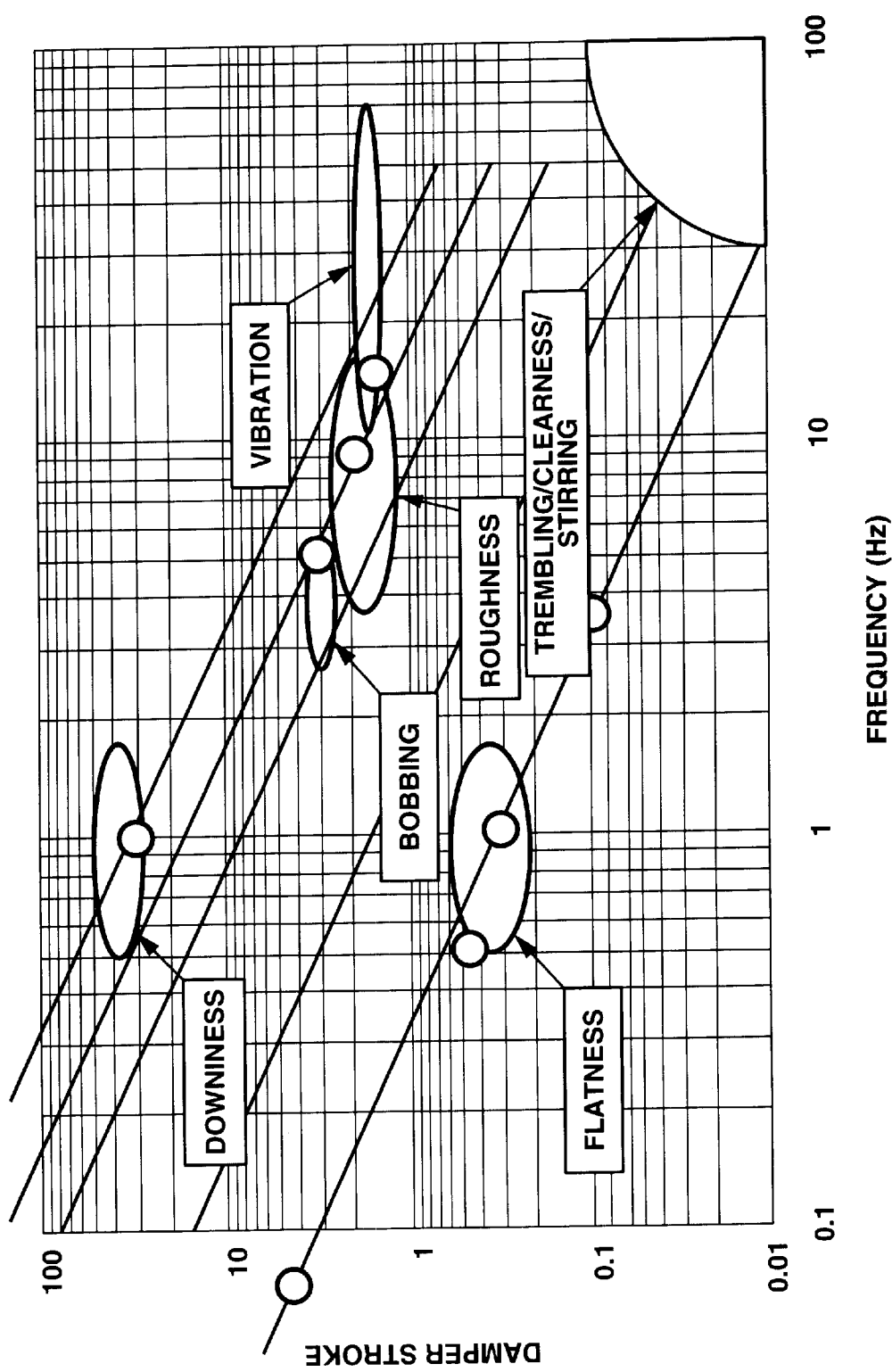
FIG. 2 is a graph illustrating the relationship between a damper stroke or amplitude, a frequency, and acceleration during real cruising.

Referring to the drawings, a hydraulic damper 1 embodying the present invention is described.

FIGS. 1–8 show a first embodiment of the hydraulic damper 1. Referring to FIG. 1, the hydraulic damper 1, which is of the twin-tube type, comprises a cylinder 2, a piston 8 slidably inserted in the cylinder 2 and for defining therein an upper chamber A and a lower chamber B, a piston ring 6 arranged at the outer periphery of the piston 8 and for ensuring slidable sealing between the cylinder 2 and the piston 8, an outer casing 13 for forming a reservoir chamber C at the outer periphery of the cylinder 2, a rod guide 3 for guiding axial movement of the piston rod 5 coupled to the piston 8 at the upper end of the cylinder 2, a seal member 4 arranged above the rod guide 3 at the upper end of the outer casing 13 and for sealing a slide portion of the piston rod 5, damping-force valves 9, 9 arranged with the piston 8, and a friction member 25 arranged on the side of the cylinder 2 to be interposed between the rod guide 3 and the seal member 4. The reservoir chamber C is filled with pressurized gas such as nitrogen gas for pressurizing hydraulic fluid, and has a base, not shown, formed at the bottom thereof and communicating with the lower chamber B of the cylinder 2.

Specifically, the piston 8 and the damping-force valve 9 are axially held by washers 10 and an auxiliary plate 11 arranged on both sides for tight engagement with the piston rod 5 through a nut 12.

Communication between the upper and lower chambers A, B is ensured by a compression-side communicating passage 9a and an expansion-side communicating passage 9b. The damping-force valves 9, 9 close the compression-side and expansion-side communicating passages 9a, 9b with respect to the upper chamber A or the lower chamber B, respectively, to restrictively allow hydraulic-fluid flow only in one direction, producing a damping force during the compression and expansion strokes.

In the first embodiment, the rod guide 3 is obtained by press working of a steel sheet material, and includes a larger-diameter portion 15 with the outer periphery abutting on the inner periphery of the outer casing 13, a smaller-diameter portion 16 extending downwardly from the larger-diameter portion 15 to be inserted in the cylinder 2, and an inner-diameter portion 17 bent inwardly from the lower end of the smaller-diameter portion 16. A recess 18 is partly formed at the outer periphery of the larger-diameter portion 15. A guide bush 19 is arranged at the inner periphery of the inner-diameter portion 17 to guide the in-and-out movement of the piston rod 5.

The seal member 4 comprises a seal lip 22 of a rubber material cured and bonded to a metal ring 21 at the inner periphery thereof. The seal lip 22 abuts on the outer peripheral face of the piston rod 5 with a given friction. The metal ring 21 is disposed on the friction member 25 as described later, the outer periphery of which is secured by bending an end 23 of the outer casing 13. An oil-retaining chamber 24 is formed between the seal member 4 and the rod guide 3.

The friction member 25 is arranged closer to the cylinder 2 than the seal member 4, e.g. between the seal member 4 and the rod guide 3 in the first embodiment, to provide friction to in-and-out movement of the piston rod 5. The friction member 25 comprises a friction element 26 made of elastic rubber material such as fluoric rubber and nitrile rubber and abutting on the outer peripheral face of the piston rod 5 in the first embodiment, and a communicating passage 27 for equalizing the pressure acting on both axial sides of the friction element 26.

The friction member 25 makes the inner peripheral face of the friction element 26 elastically contact the outer peripheral face of the piston rod 5 to provide a given friction to slide movement of the piston rod 5 so as to attenuate relative vibrations of the cylinder 2 and the piston rod 5, improving the ride quality of automotive vehicles. In the first embodiment, the friction element 26 is arranged at the inner periphery of a metal ring 28 so that the friction element 26 elastically contacts the outer peripheral face of the piston rod 5, and the metal ring 28 is held between the larger-diameter portion 15 of the rod guide 3 and the metal ring 21 of the seal member 4. The friction element 26 is cured and bonded to the metal ring 28 at the inner periphery thereof, and in the first embodiment, it is disposed on the side distant from the seal member 4. The communicating passage 27 is axially formed through the friction element 26 and the metal ring 28.

A dynamic spring constant of the friction member 25, more specifically, a dynamic spring constant of the friction element 26 of the friction member 25, is set to be greater than friction produced at the seal lip 22. Moreover, the dynamic spring constant of the friction member 25 is set to vary with an axial operating amplitude of the piston rod 5 in such a way as to at least be equal to or greater than 50 N/mm (preferably, 200 N/mm) when the axial operating amplitude is smaller than ±0.1 mm, and be smaller than 50 N/mm (preferably, 40 N/mm) when the axial operating amplitude is equal to or greater than ±0.5 mm.

A communicating passage 29 is formed through the metal ring 28 of the friction member 25 to extend from the outer periphery of the metal ring 28 to the top face of the seal member 4. The communicating passage 29 matches with the recess 18 of the larger-diameter portion 15 of the rod guide 3 to allow communication between the reservoir chamber 14 and the oil retaining chamber 24.

A one-way valve 31 is arranged between the seal member 4 and the friction member 25 to allow hydraulic-fluid flow from the oil-retaining chamber 24 to the reservoir chamber 14 and block flow in the reverse direction. In the first embodiment, the one-way valve 31 is formed with the seal member 4, and comprises a lip portion 32 abutting on the metal ring 28 of the friction member 25.

Next, the operation and effect of the first embodiment is described.

When the hydraulic damper 1 is applied to automotive suspension systems, a sealed end of the cylinder 2 is secured to the lower side of a spring or a wheel through a bracket, not shown, mounted to the outer casing 13, whereas a protruding end of the piston rod 5 is secured to the upper side of a spring or a vehicle body.

In this state, in the hydraulic damper 1, the piston 8 within the cylinder 2 reciprocates in accordance with in-and-out movement of the piston rod 5 under operation of the damping-force valves 9, 9 arranged with the piston, absorbing and attenuating vibrations resulting from the road surface.

A volume variation of the cylinder 2 in accordance with in-and-out movement of the piston rod 5 are compensated by hydraulic fluid within the reservoir chamber C communicating with the cylinder 2 through a base portion, not shown. After lubrication of the guide bush 19, part of hydraulic fluid within the cylinder 2 is led to the oil-retaining chamber 24 for lubrication of the friction element 26 of the friction member 25 and the seal lip 22 of the seal member 4. Then, hydraulic fluid within the oil-retaining chamber 24 is circulated to the reservoir chamber C through the one-way valve 31 and the communicating passage 29.

Moreover, in the hydraulic damper 1, due to the above configuration, when the cylinder 2 and the piston rod 5 are moved relative to each other, the outer peripheral face of the friction element 26 of the friction member 25 elastically contacts the outer peripheral face of the piston rod 5 at a predetermined pressure for slide movement, obtaining the friction capability.

Friction produced at the friction member 25 is set to be greater than friction produced at the seal lip 22 of the seal member 4, so that the influence of friction occurring at the seal lip 22 can be reduced with maximally restrained wear of the seal lip 22.

The friction capability of the friction element 26 of the friction member 25 attenuates low-frequency vibrations with rather low speed and large amplitude of the piston rod 5 with respect to the cylinder 2. When having high-frequency vibrations with slight amplitude of the piston rod 5, the friction capability preserves elastic contact of various surfaces of the friction element 26 of elastic rubber material with respect to the piston rod 5 through its radial elastic deformation, thereby securing the stable and long-term friction performance of the friction member 25. Moreover, the friction element 26 is axially deformed in a viscoelastic way, thereby obtaining a slight delay of occurrence of friction with respect to the speed of movement of the piston rod 5. Therefore, when the direction of movement of the piston rod 5 is switched with respect to the cylinder 2, i.e. the speed of movement of the piston rod 5 is zero, in particular, the friction element 26 has static friction greater than dynamic friction to increase an absolute value of friction, i.e. enhance a dynamic spring constant of the hydraulic damper 1 by an axial viscoelastic force of the friction member 25, attenuating high-frequency vibrations with slight amplitude of the piston rod 5 with respect to the cylinder 2.

Control of a timing of occurrence and a magnitude of friction of the friction element 26 of the friction member 25 with respect to the speed of movement of the piston rod 5 can be ensured by selecting the rigidity, i.e. a material, shape, etc., of the friction element 26.

When the piston rod 5 moves in-and-out, the pressure within the cylinder 2 varies with the incoming volume of the piston rod 5, which may operate on the friction member 25. In the first embodiment, however, since the communicating passage 27 is formed through the friction member 25 to equalize the pressure acting on both axial sides of the friction element 26, the friction member 25 can produce stable friction substantially without undergoing any influence of this pressure variation. Therefore, an effective reduction can be obtained in wide-ranging vibrations including high-frequency vibrations.

More specifically, by setting the dynamic spring constant of the friction member 25 to vary with an axial operating amplitude of the piston 8 or the piston rod 5 in such a way as to at least be equal to or greater than 50 N/mm (preferably, 200 N/mm) when the axial operating amplitude is smaller than ±0.1 mm, and be smaller than 50 N/mm (preferably, 40 N/mm) when the axial operating amplitude is equal to or greater than ±0.5 mm, more effective reduction can be obtained both in low-frequency vibrations and in high-frequency vibrations.

Then, a detailed description is made below with regard to the basis of a dynamic spring constant with a value determined for improving the ride quality of automotive vehicles.

One of the ride-quality enhancement factors required for prestige vehicles is a reduction in high-frequency vibrations. Referring to FIG. 2 which shows the relationship between a damper stroke or amplitude, a frequency, and acceleration during real cruising, when illustrating an area of high-frequency vibrations in connection with an operating area of the hydraulic damper 1, it corresponds to a frequency area for a feel of "trembling/clearness/stirring", and is pertinent to a slight-amplitude and high-frequency (rather slow speed) operation for the hydraulic damper 1.

Figure 3:
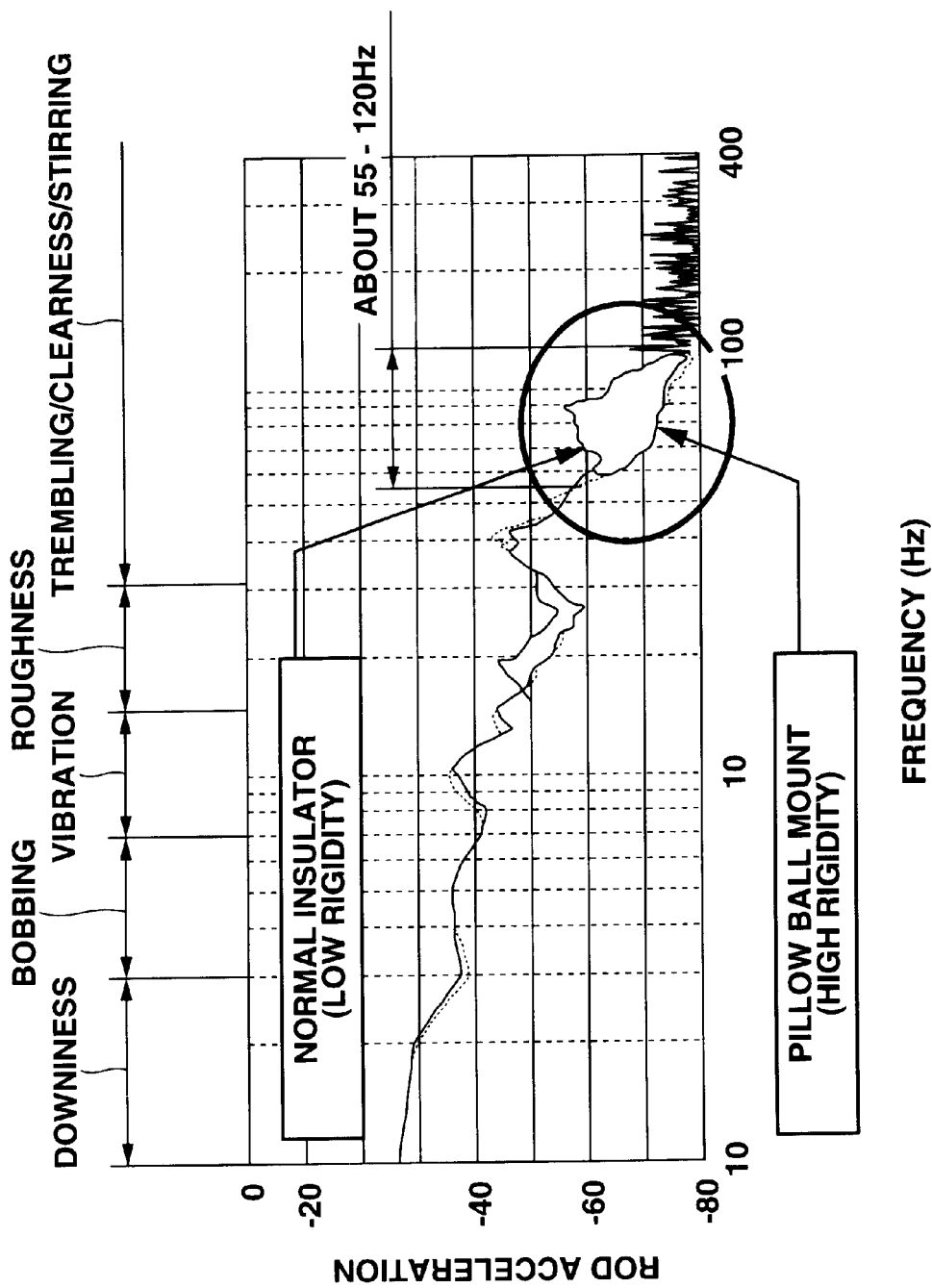
FIG. 3 is view similar to FIG. 2, illustrating a level of vertical-acceleration spectrum on a driver's seat surface with respect to a frequency when using a normal insulator with low rigidity and a pillow ball mount with high rigidity.

FIG. 3 shows results of tests for checking the influence of rod-acceleration resonance components (100 Hz) with distinction therebetween defined on a bench upon the ride quality of vehicles, i.e. a level of vertical-acceleration spectrum on a driver's seat surface with respect to a frequency when using a normal insulator with low rigidity (as illustrated by the dotted line) and a pillow ball mount with high rigidity (as illustrated by the solid line). As seen in FIG. 3, in a low-frequency area of 15–40 Hz corresponding to a frequency band for a feel of "roughness", the vertical-acceleration level is slightly higher with the pillow ball mount than with the normal insulator, whereas in a high-frequency area of 50–200 Hz corresponding to a frequency band for a feel of "trembling/clearness/stirring", the vertical-acceleration level is significantly lower with the pillow ball mount than with the normal insulator, showing a remarkable difference between the two in frequency characteristic of the vertical-acceleration level due to mount rigidity.

Specifically, since the pillow ball mount, which is much greater in axial support rigidity for the piston rod 5 than the normal insulator, produces little rod acceleration, it reduces vibration transfer in the high-frequency area of about 50–200 Hz. A test drive of this vehicle can clearly realize a difference between the two sets of data such that the pillow ball mount slightly deteriorates a feel of "roughness", but significantly improves a feel of "trembling/stirring" due to low level of high-frequency vibrations, providing very clean and clear ride quality.

Therefore, when adding the friction capability to the hydraulic damper 1 to reduce high-frequency components of rod acceleration as in the first embodiment, a great reduction effect may be obtained with respect to a feel of "trembling/stirring" and road noise for a vehicle in a similar way to with the pillow ball mount.

Moreover, when adding the friction capability to the hydraulic damper 1, two reduction effects may be obtained with respect to the acceleration level of low-frequency of about 15–40 Hz to be achieved by the normal insulator and that of high-frequency of about 50–200 Hz to be achieved by the pillow ball mount, thereby reducing the seat vertical acceleration level over a wide frequency band, improving the ride quality of vehicles.

Figure 4A:
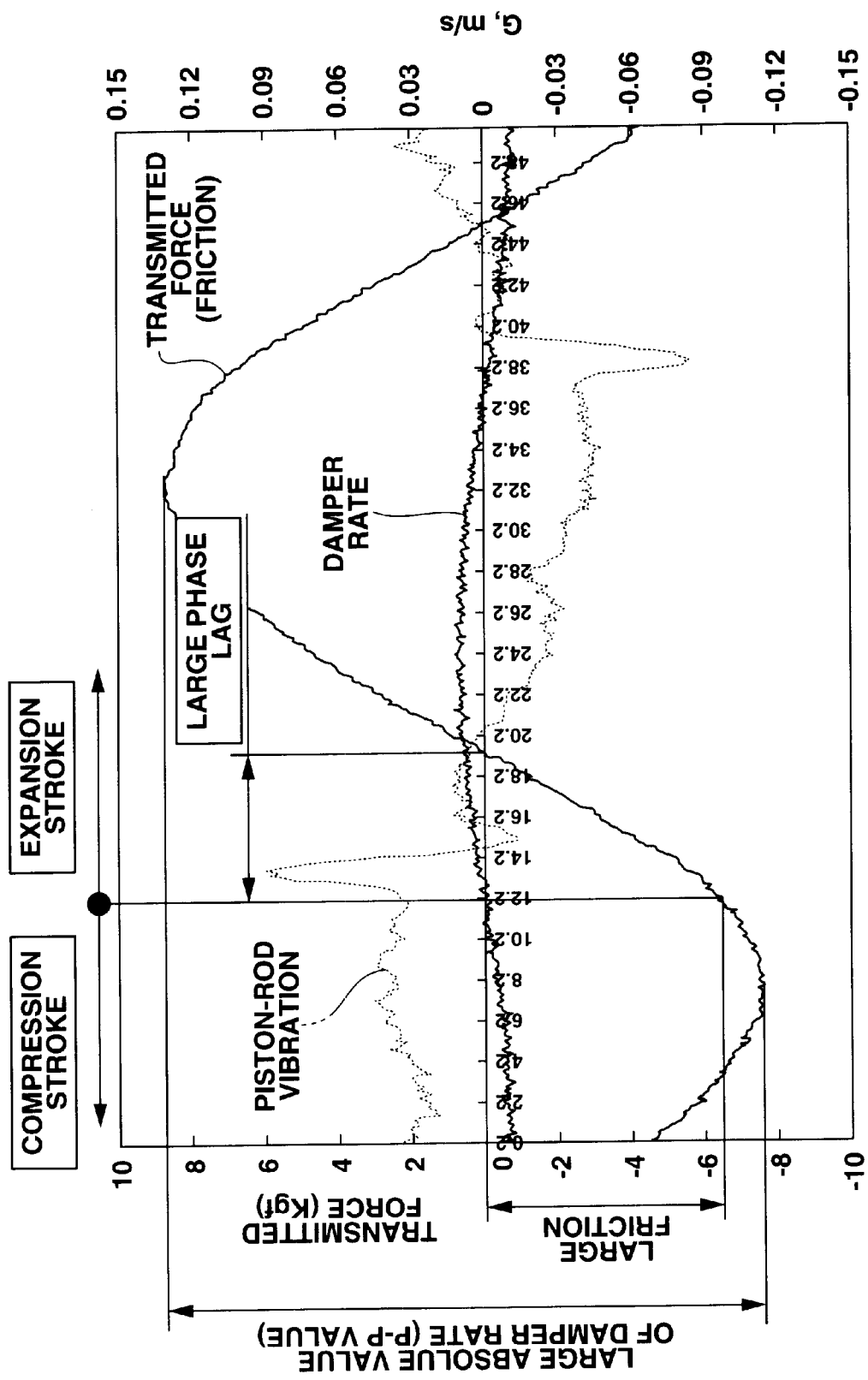
FIGS. 4A–4B are views similar to FIG. 3, showing results of measurements for rod acceleration when applying vibrations with slight amplitude and high frequency to a domestic standard hydraulic damper and an European high-grade hydraulic damper.
Figure 4B:
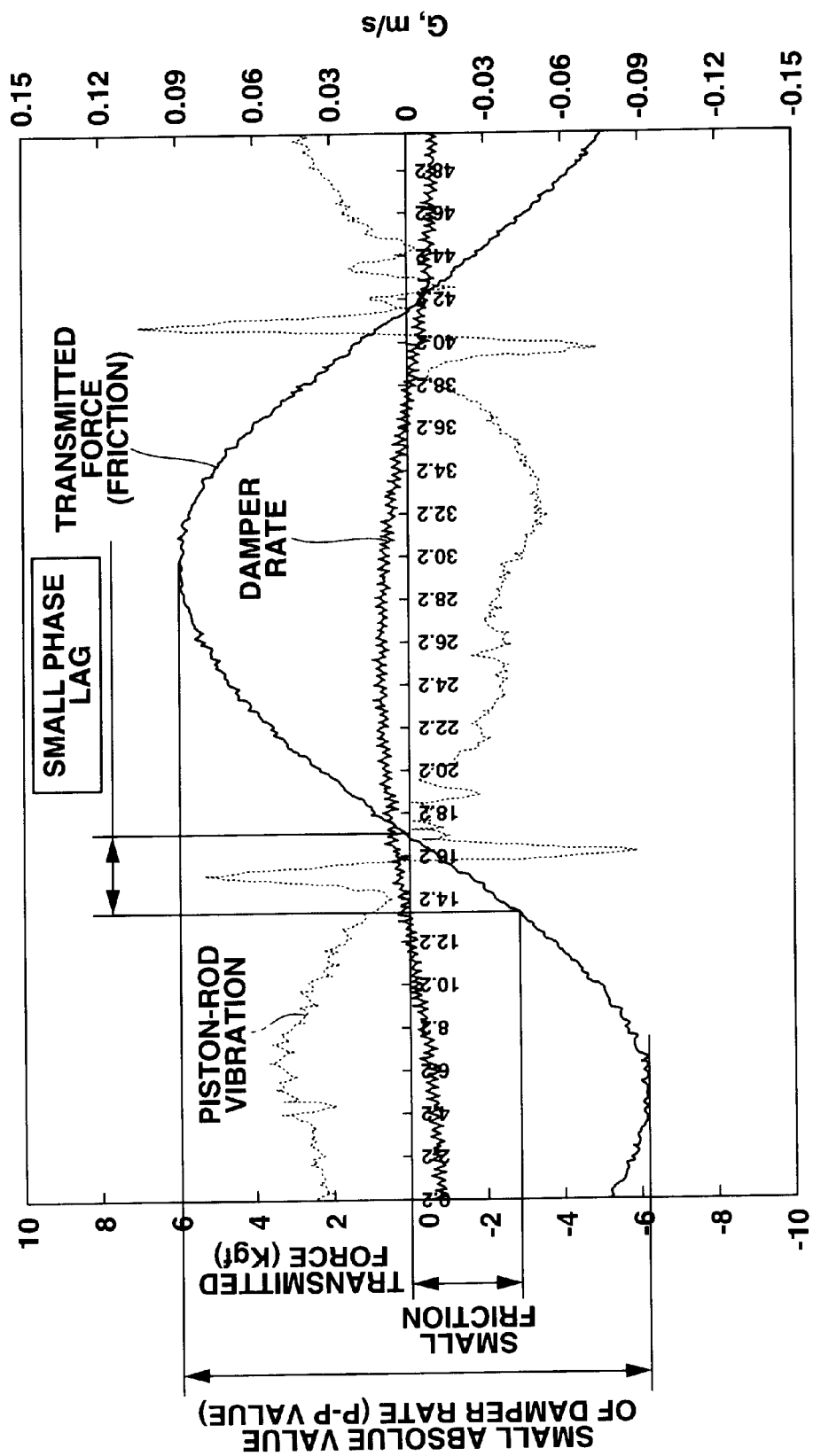

FIGS. 4A–4B show results of measurements for rod acceleration when applying vibrations with slight amplitude and high frequency (0.01 m/s·20 Hz (±0.09 mm)), wherein FIG. 4A is pertinent to a conventional standard hydraulic damper as a typical example of a rod-acceleration reducing effect, and FIG. 4B is pertinent to a hydraulic damper or rod-acceleration reducing damper wherein a rod-acceleration reducing effect is enhanced by increasing a friction value through increased tightening force of the seal lip of the seal member compared with the standard hydraulic damper.

Referring to FIG. 4A, the rod-acceleration reducing damper has high attenuation for high-frequency vibrations of rod acceleration. High-frequency vibration components of rod acceleration are produced immediately after switching of the stroke of the hydraulic damper. In the rod-acceleration reducing damper, the phase lag for a transmitted force or friction is large with respect to the damper rate, and its absolute value or P-P value is also large, so that a transmitted force or friction produced on switching of the stroke of the hydraulic damper is greater, which contributes to attenuation of high-frequency vibrations of rod acceleration.

On the other hand, in the standard hydraulic damper, referring to FIG. 4B, the phase lag for a transmitted force is small with respect to the damper rate, and its absolute value is also small, so that a transmitted force produced on switching of the stroke of the hydraulic damper is smaller, having less force for attenuating high-frequency vibrations of rod acceleration.

FIG. 5 shows results of measurements for the friction characteristic with respect to the damper stroke, which are carried out to ascertain a cause of occurrence of greater transmitted force and phase lag when applying vibrations with slight amplitude and high frequency. As seen in FIG. 5, the rod-acceleration reducing damper is higher in friction than the standard hydraulic damper to have a dynamic spring constant increasing as the amplitude is smaller. That is, larger friction implies larger damping force when receiving vibrations with slight amplitude and high frequency, whereas larger dynamic spring constant implies larger phase lag with respect to the damper rate.

The foregoing reveals that a reduction in high-frequency vibrations can be achieved by increasing friction produced at the hydraulic damper and a dynamic spring constant when receiving vibrations with slight amplitude and high frequency.

Referring to FIG. 6, in order to determine an optimum value of friction characteristic, i.e. friction and dynamic spring constant, a range of a real value of dynamic spring constant with respect to the damper stroke is measured in a vehicle with rod-acceleration reducing damper. Base on the measurement results, a target value of dynamic spring constant was determined to 200–450 N/mm. And based on the target value, the dynamic spring constant of the friction member 25 was set to vary with an axial operating amplitude of the piston 8 in such a way as to at least be equal to or greater than 50 N/mm (preferably, 200 N/mm) when the axial operating amplitude is smaller than ±0.1 mm, and be smaller than 50 N/mm (preferably, 40 N/mm) when the axial operating amplitude is equal to or greater than ±0.5 mm.

As described above in detail, in the first embodiment, fulfillment of the friction capability of the hydraulic damper 1 produces an effect to allow an effective reduction in wide-ranging vibrations including high-frequency vibrations, resulting in improved ride quality of the vehicle.

Moreover, in the first embodiment, the hydraulic damper 1 produces the following effect with respect to the vehicle with rod-acceleration reducing damper.

Figure 7:
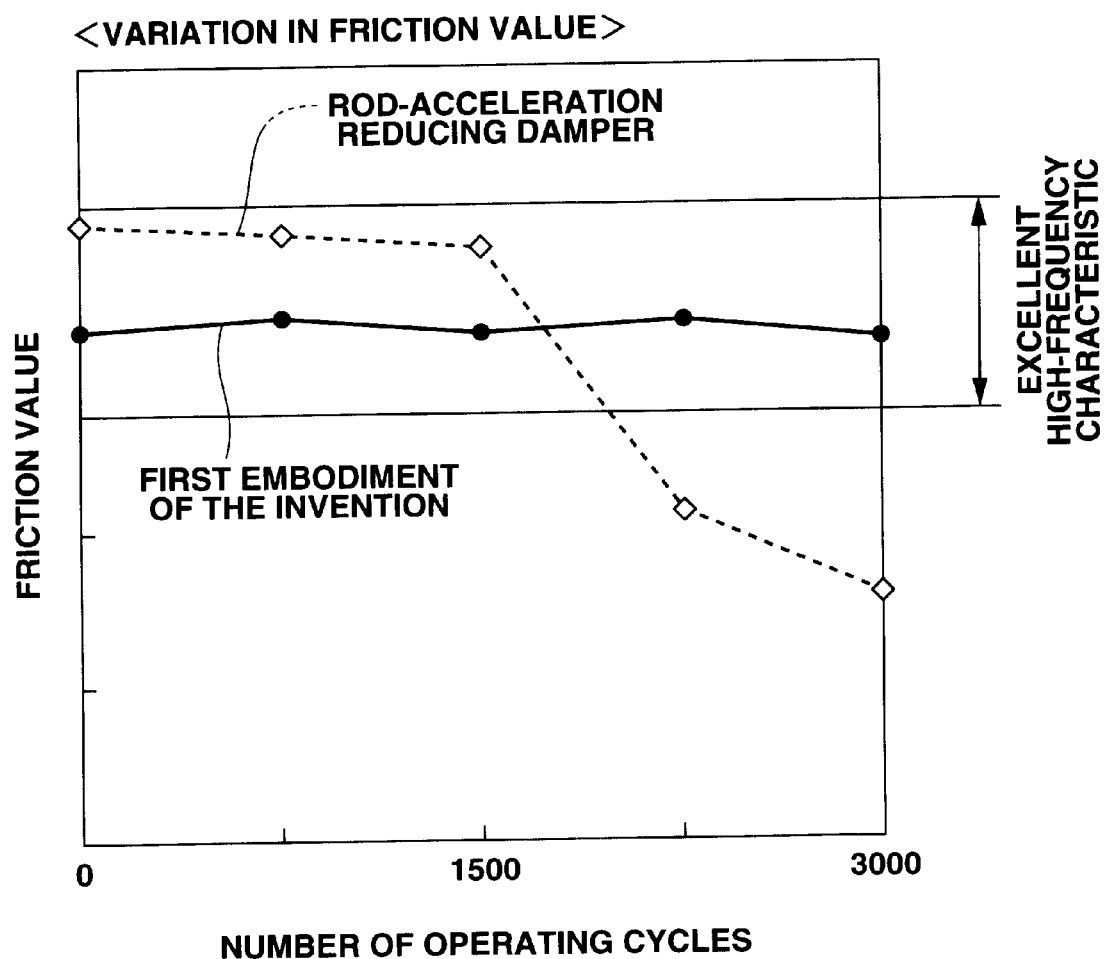
FIG. 7 is a view similar to FIG. 6, illustrating the variation characteristic of a friction value of the hydraulic damper in the first embodiment with respect to the number of operating cycles thereof.
Figure 8:
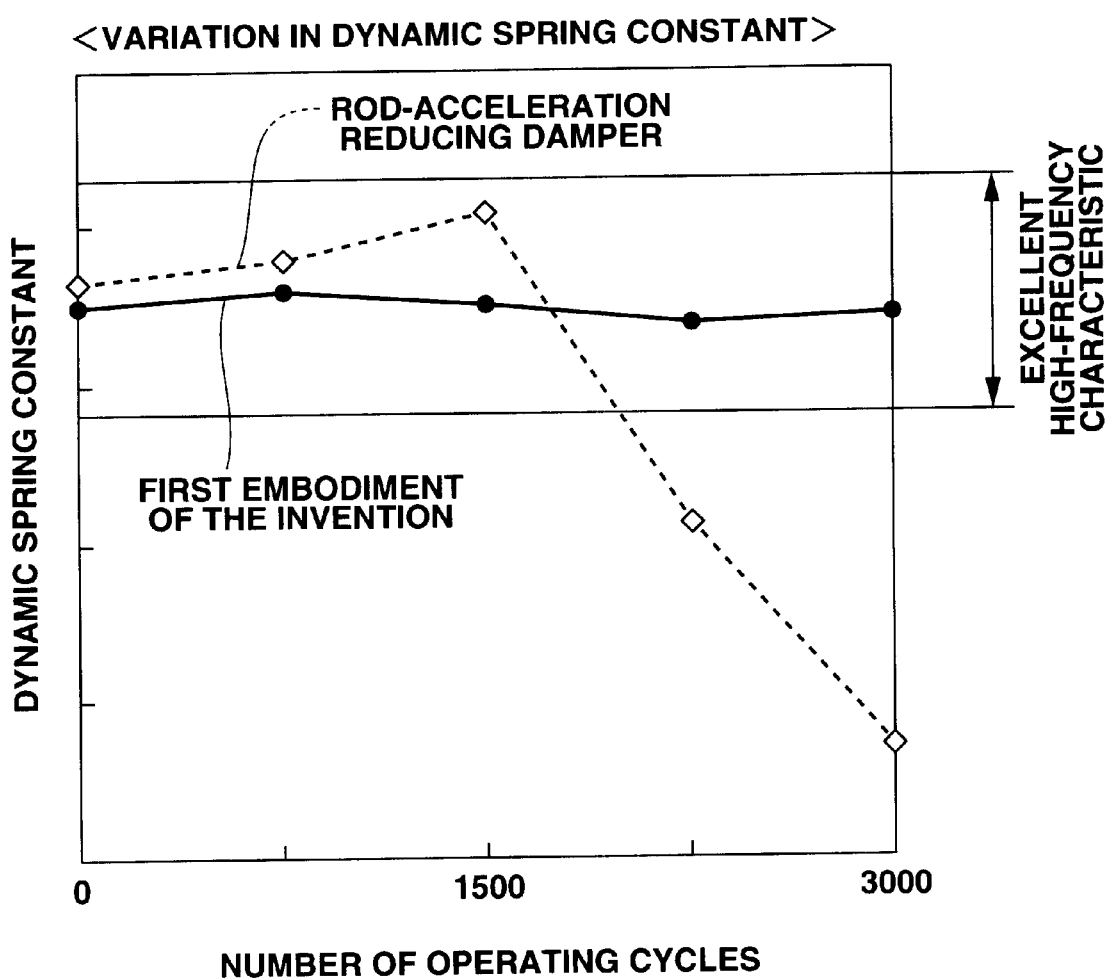
FIG. 8 is a view similar to FIG. 8, illustrating the variation characteristic of a dynamic spring constant of the hydraulic damper in the first embodiment with respect to the number of operating cycles thereof.

FIG. 7 is a graph illustrating the variation characteristic of a friction value of the hydraulic damper with respect to the number of operating cycles thereof. FIG. 8 is a graph illustrating the variation characteristic of a dynamic spring constant of the hydraulic damper with respect to the number of operating cycles thereof. As seen in FIGS. 7–8, in the vehicle with rod-acceleration reducing damper, at first, both friction value and dynamic spring constant have higher values as illustrated by the dotted lines, but they are sharply reduced when the number of operating cycles of the hydraulic damper exceeds 1500 (×10³). On the other hand, with the hydraulic damper 1 in the first embodiment, both friction value and dynamic spring constant are maintained at higher values as illustrated by the solid lines even when the number of operating cycles of the hydraulic damper 1 exceeds 1500 (×10³).

In the vehicle with rod-acceleration reducing damper, a tightening force of the seal lip of the seal member is increased to enhance a friction value, so that not only setting of the friction characteristic affects the oil seal performance, but the lubricity is poor at the friction producing part, resulting in not only lowered flexibility and stability, but greatly deteriorated durability of the friction characteristic.

On the other hand, with the hydraulic damper 1 in the first embodiment, in addition to the seal lip 22 of the seal member 4, the friction member 25 is arranged within the cylinder 2, so that lubricating oil or hydraulic fluid provides excellent stability of a friction value without affecting the oil sealability, resulting in not only increased flexibility and stability, but significantly enhanced durability of the friction characteristic, i.e. excellent continuity of the effect.

As described above, in the first embodiment, the hydraulic damper is superior in the continuity or durability of a friction value and a dynamic spring constant than the vehicle with rod-acceleration reducing damper, obtaining an effect to allow the ride quality of vehicles to be secured over the long term.

Referring next to FIGS. 9–49, other embodiments of the present invention are described. In the disclosure of the other embodiments, similar parts to those in the first embodiment are not illustrated nor described, or are designated by the same reference numerals, the description of which is omitted, and only the difference is depicted.

Figure 9:
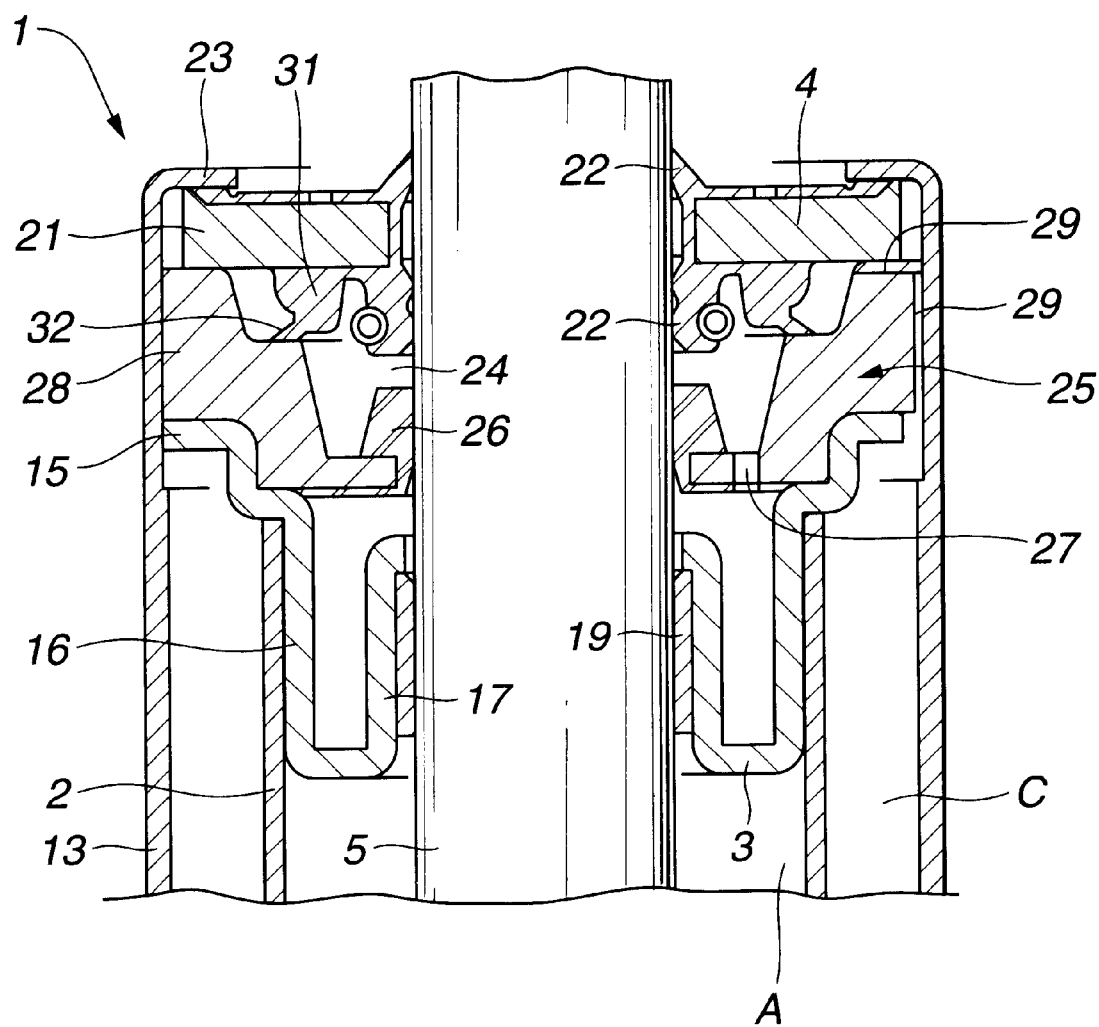
FIG. 9 is a view similar to FIG. 1, showing a second embodiment of the present invention.

FIG. 9 shows a second embodiment of the hydraulic damper 1, wherein the friction element 26 of the friction member 25 is arranged at the inner periphery of the metal ring 28 in a similar way to in the first embodiment as shown in FIG. 1, but it is disposed on the side close to the seal member 4.

Figure 10:
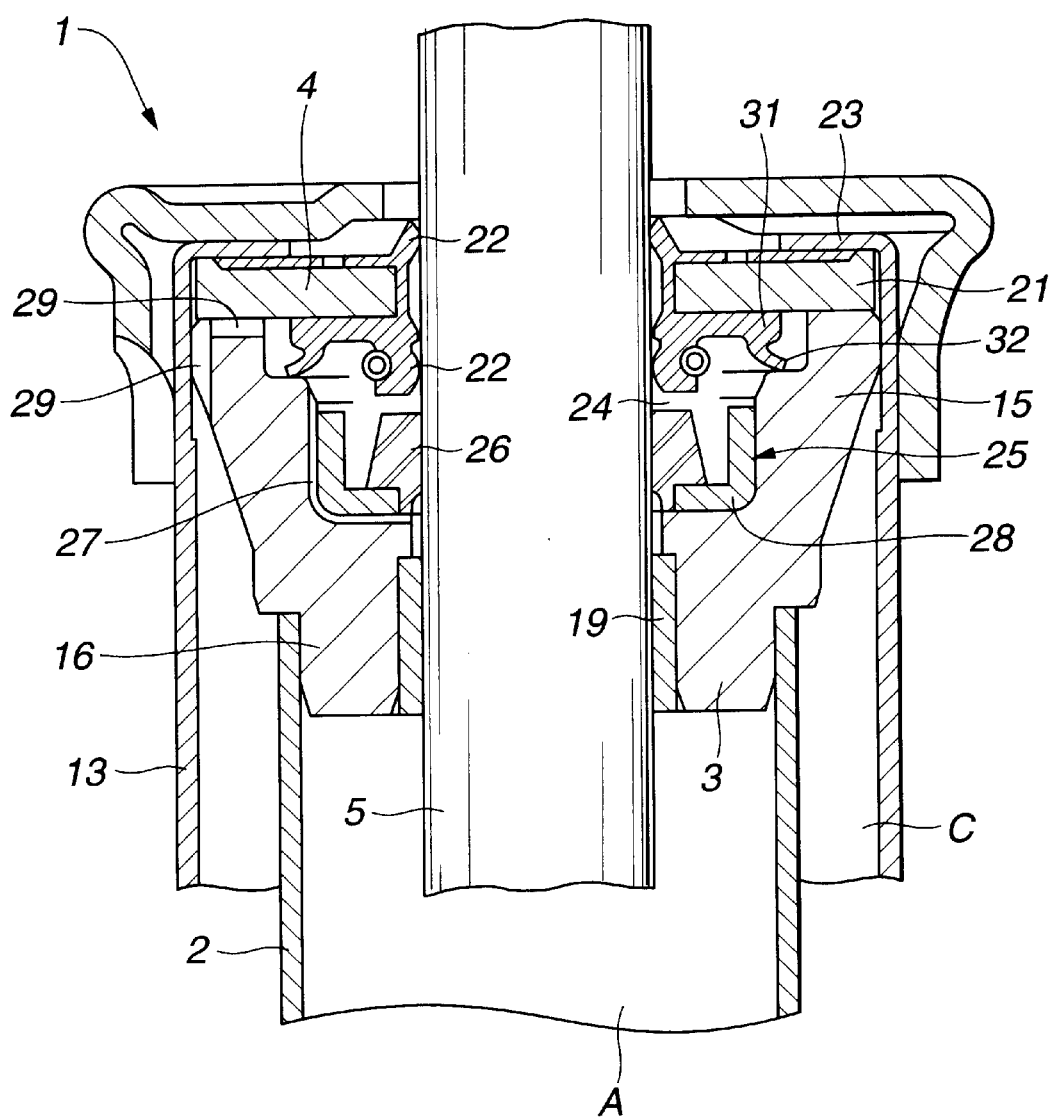
FIG. 10 is a view similar to FIG. 9, showing a third embodiment of the present invention.

FIG. 10 shows a third embodiment of the hydraulic damper 1, wherein the rod guide 3 is obtained by machining or formed out of sintered metal, the friction member 25 is arranged at the inner periphery of the rod guide 3, and the communicating passage 27 is formed between the metal ring 28 of the friction member 25 and the rod guide 3.

Figure 11:
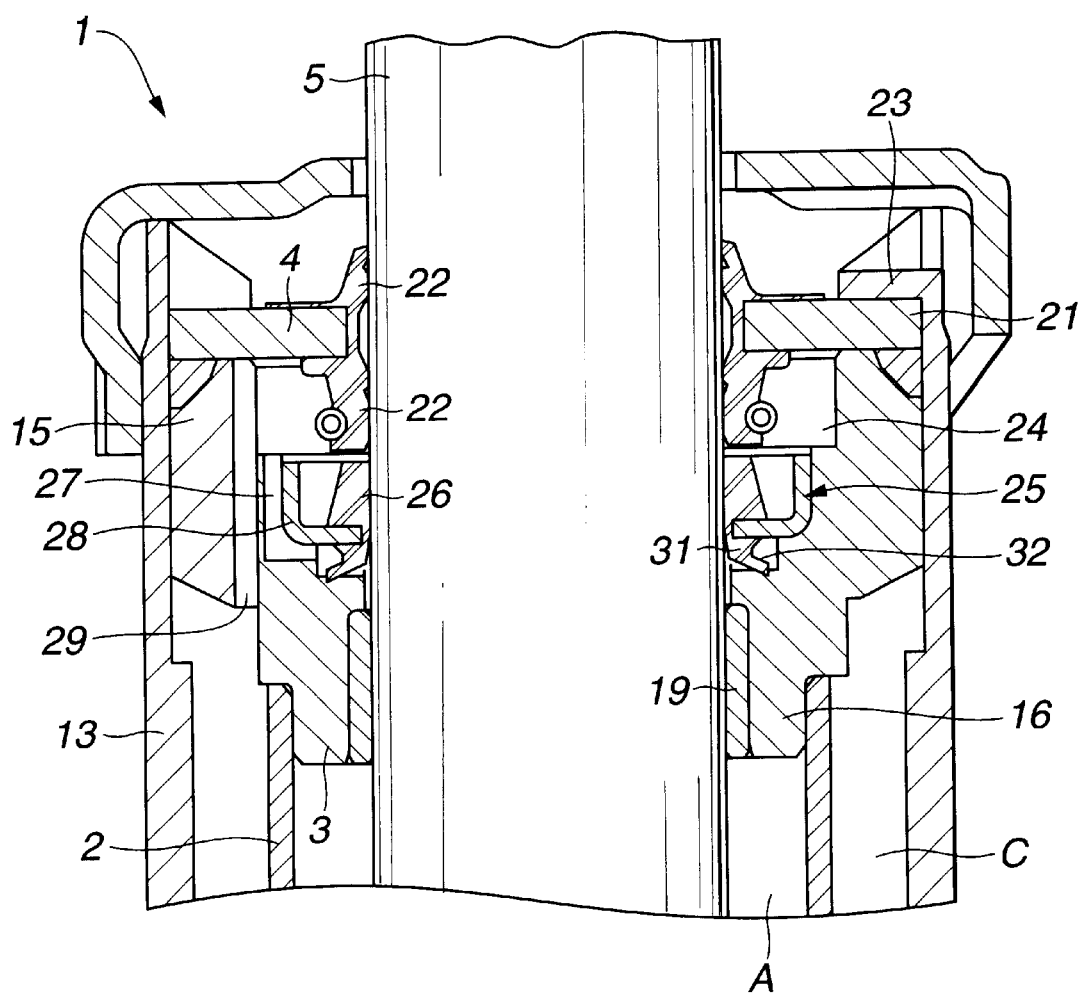
FIG. 11 is a view similar to FIG. 10, showing a fourth embodiment of the present invention.
Figure 12:
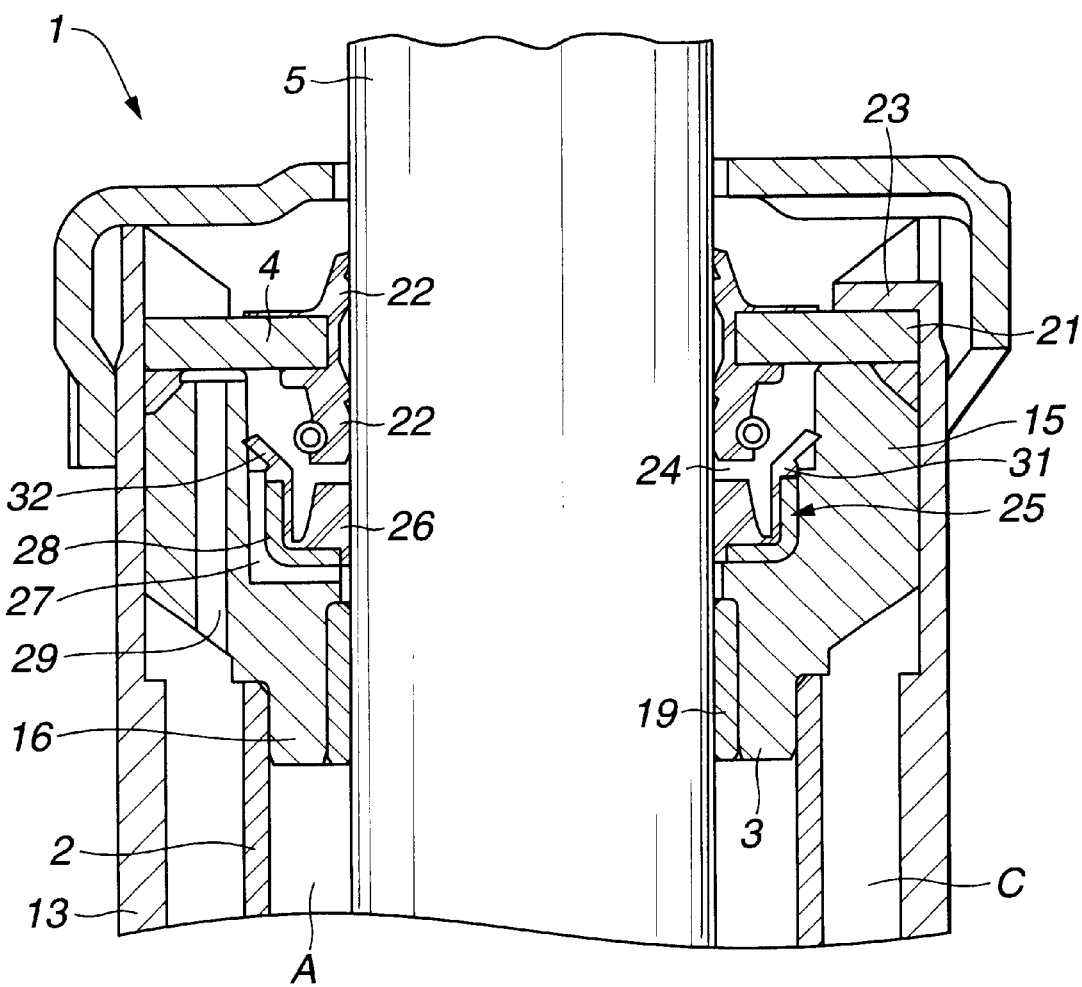
FIG. 12 is a view similar to FIG. 11, showing a fifth embodiment of the present invention.

FIGS. 11–12 show fourth and fifth embodiments of the hydraulic damper 11 respectively, wherein the rod guide 3 is obtained by machining or formed out of sintered metal, the friction member 25 is arranged at the inner periphery of the rod guide 3, and the communicating passage 27 is formed between the metal ring 28 of the friction member 25 and the rod guide 3. Moreover, the one-way valve 31 is formed with the friction member 25 to allow hydraulic-fluid flow from the oil-retaining chamber 24 to the reservoir chamber C. The one-way valve 31 is arranged at the lower end of the friction member 25 in the fourth embodiment as illustrated in FIG. 11, and at the outer periphery in the fifth embodiment as illustrated in FIG. 12.

Figure 13:
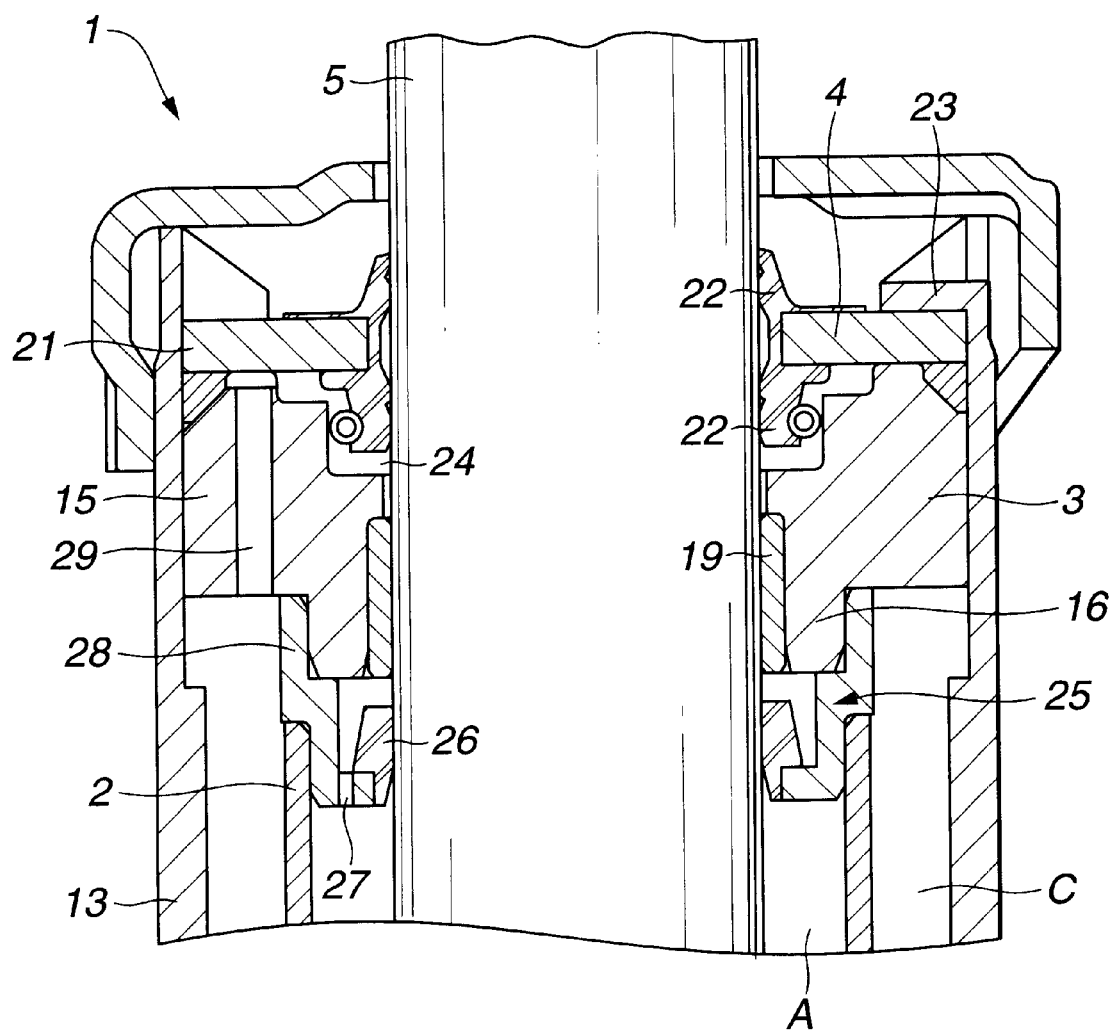
FIG. 13 is a view similar to FIG. 12, showing a sixth embodiment of the present invention.

FIG. 13 shows a sixth embodiment of the hydraulic damper 1, wherein the rod guide 3 is obtained by machining or formed out of sintered metal, and the friction member 25 is arranged more inwardly of the cylinder 2 with respect t the rod guide 3, i.e. below the rod guide 3, and between the rod guide 3 and the cylinder 2. Specifically, the metal ring 28 of the friction member 25 is mounted to the smaller-diameter portion 16 of the rod guide 3, and the cylinder 2 is mounted to the metal ring 28 of the friction member 25.

Figure 14:
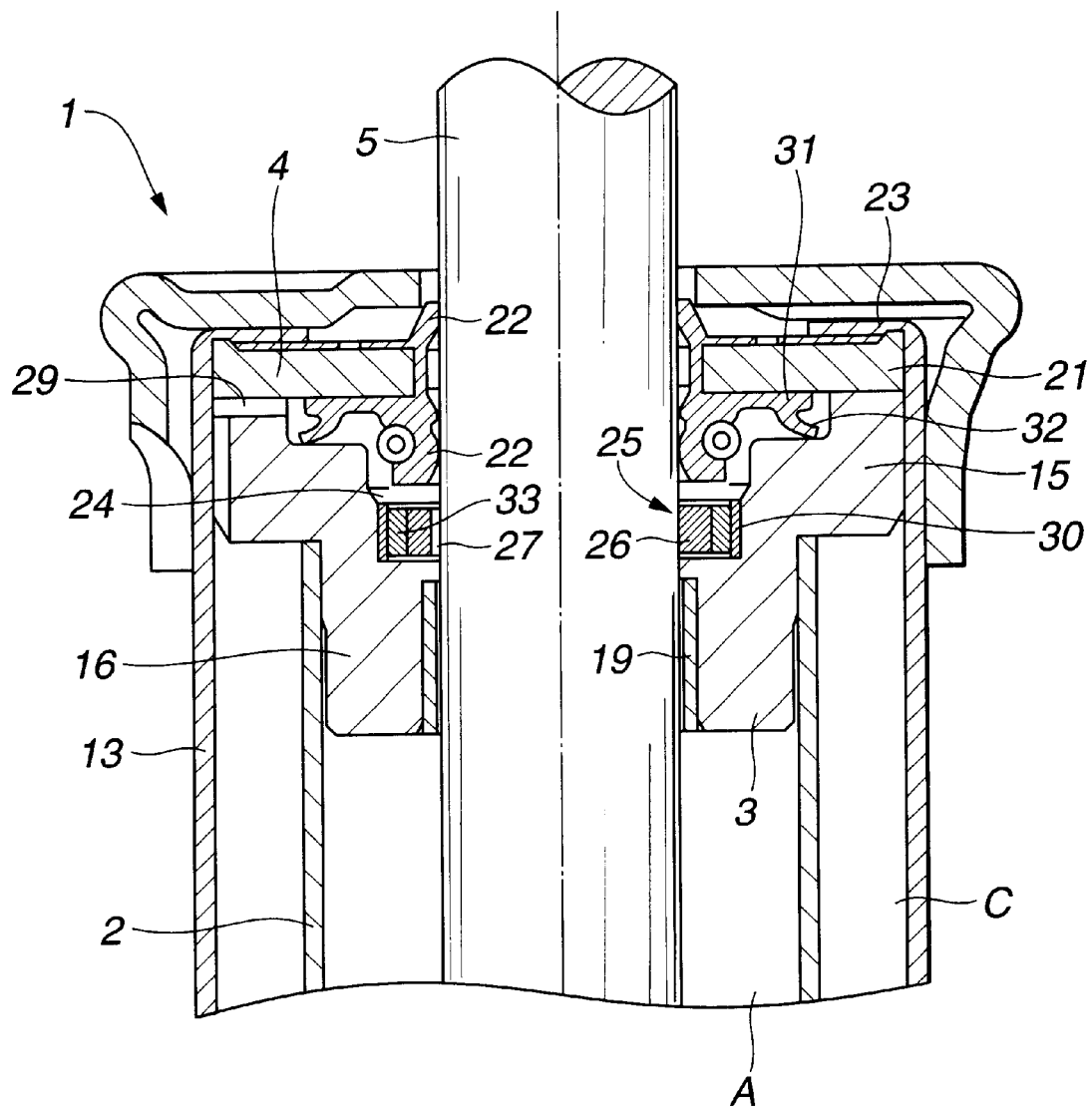
FIG. 14 is a view similar to FIG. 13, showing a seventh embodiment of the present invention.
Figure 15:
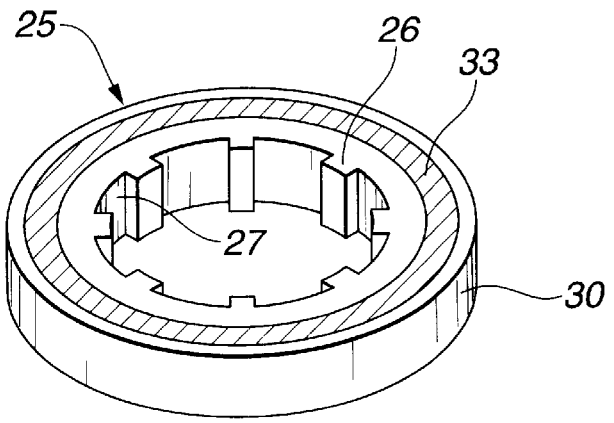
FIG. 15 is a perspective view showing a friction member in the seventh embodiment.

FIGS. 14–15 show a seventh embodiment of the hydraulic damper 1, wherein the rod guide 3 is obtained by machining or formed out of sintered metal, and the friction member 25 is arranged at the inner periphery of the rod guide 3. Referring to FIG. 15, the friction member 25 has a triplex integral structure comprising an outer ring 30 mounted to the rod guide 3, a friction element 26 of a resin material abutting on the outer peripheral face of the piston rod 5, and an elastic ring 33 of elastic rubber material interposed between the outer ring 30 and the friction element 26. A communicating passage 27 includes a plurality of portions formed circumferentially equidistantly in the inner surface of the friction element 26.

In the seventh embodiment, the radial elasticity and axial viscoelasticity of the elastic ring 33 provides the same operation and effect as that of the first embodiment.

Figure 16:
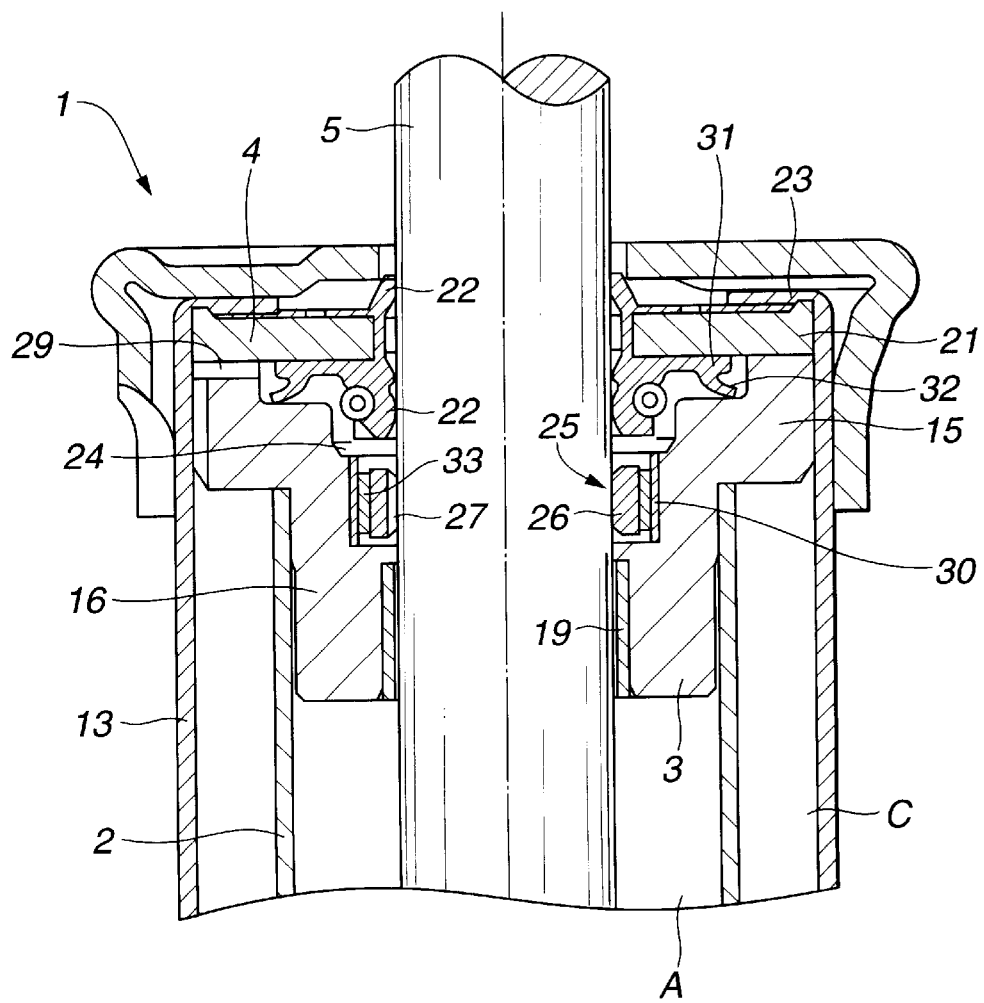
FIG. 16 is a view similar to FIG. 14, showing an eighth embodiment of the present invention.
Figure 17:
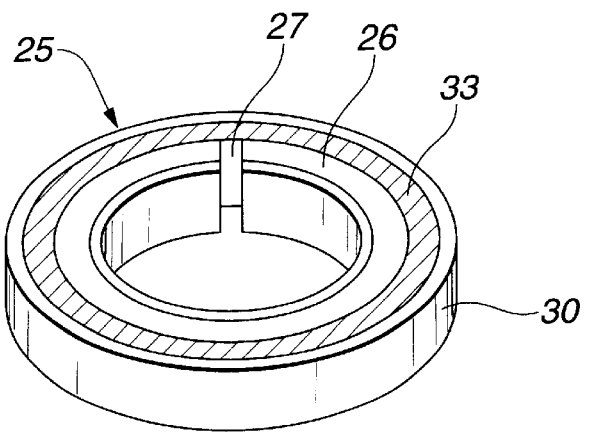
FIG. 17 is a view similar to FIG. 15, showing the friction member in the eighth embodiment.

FIGS. 16–17 show an eighth embodiment of the hydraulic damper 1, which is substantially the same as the seventh embodiment except that the communicating passage 27 is in the form of a recess formed axially.

Figure 18:
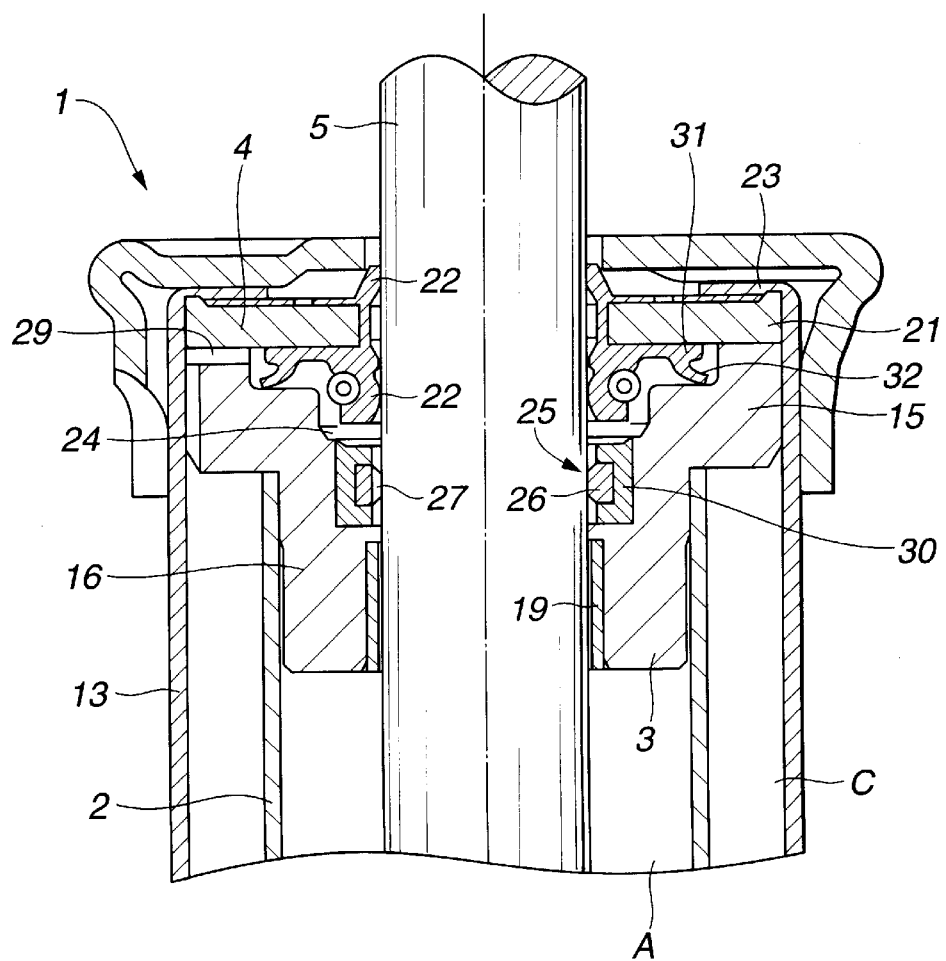
FIG. 18 is a view similar to FIG. 16, showing a ninth embodiment of the present invention.

FIG. 18 shows a ninth embodiment of the hydraulic damper 1, which is substantially the same as the seventh embodiment except that the friction element 26 is engaged with an annular groove 33a formed in the inner periphery of the elastic ring 33.

Figure 19:
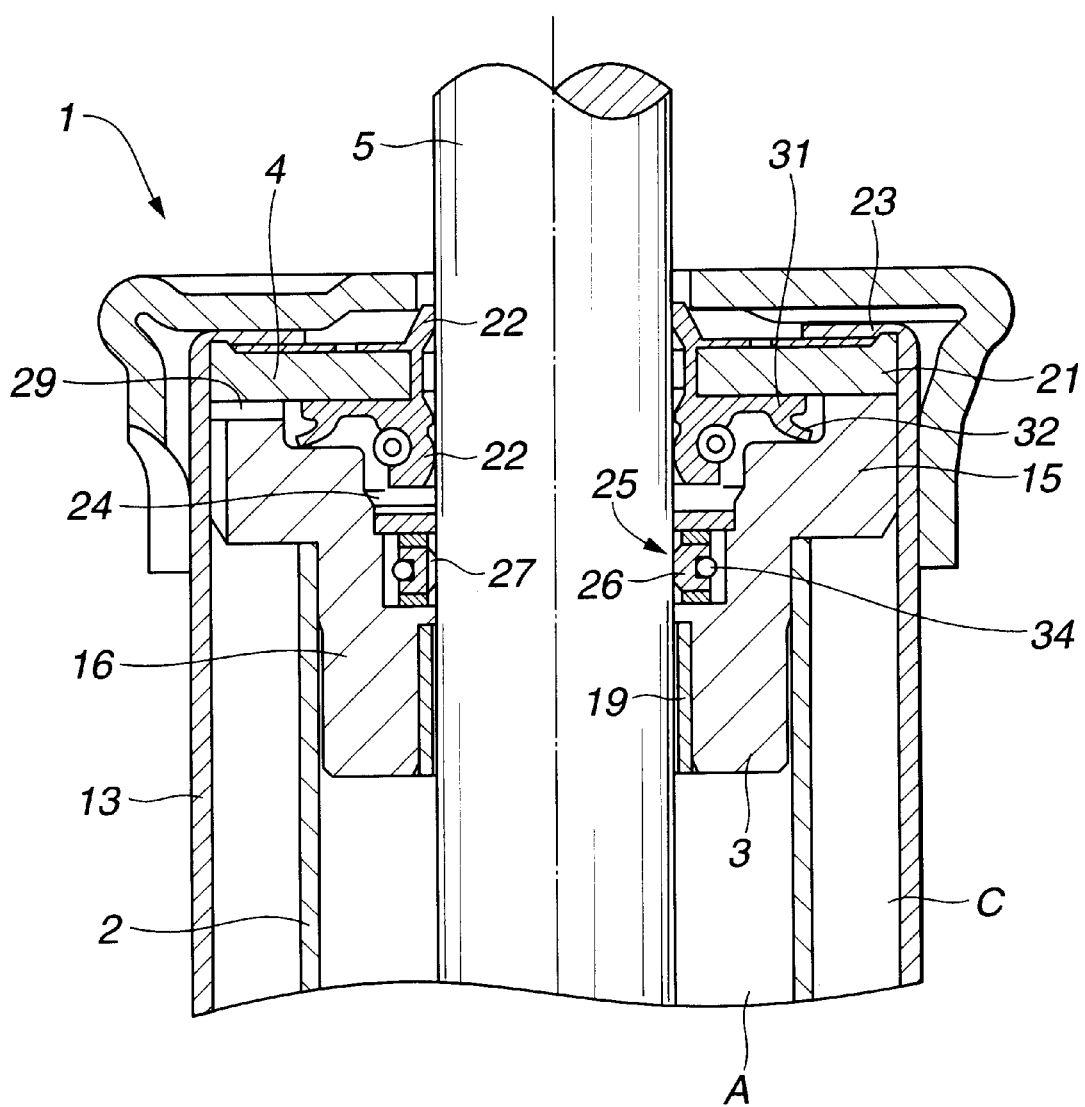
FIG. 19 is a view similar to FIG. 18, showing a tenth embodiment of the present invention.

FIG. 19 shows a tenth embodiment of the hydraulic damper 1, which is substantially the same as the ninth embodiment except that the radial elasticity is obtained by an annular spring 34 secured to the outer periphery of the friction element 26.

Figure 20:
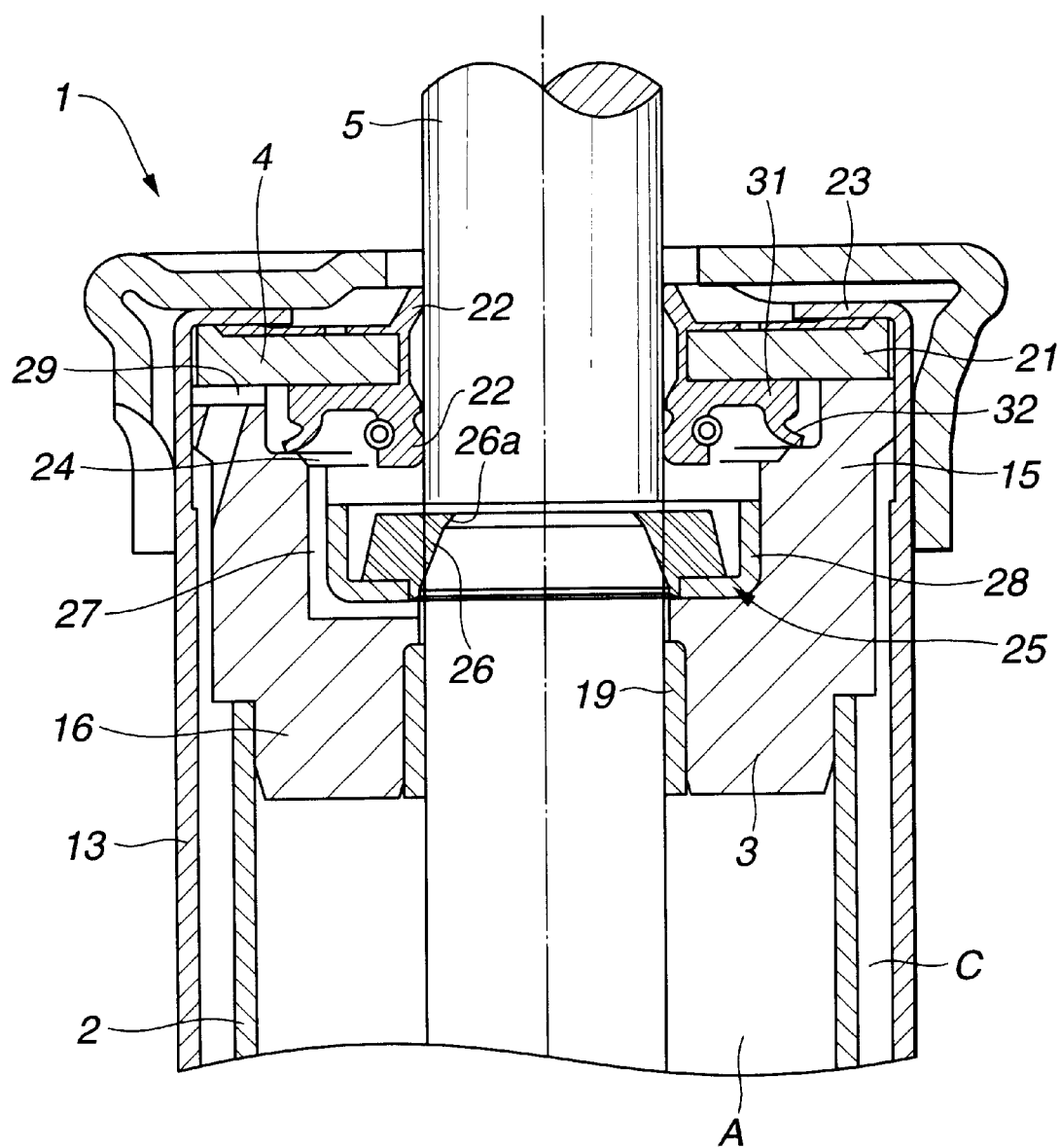
FIG. 20 is a view similar to FIG. 19, showing an eleventh embodiment of the present invention.
Figure 21:
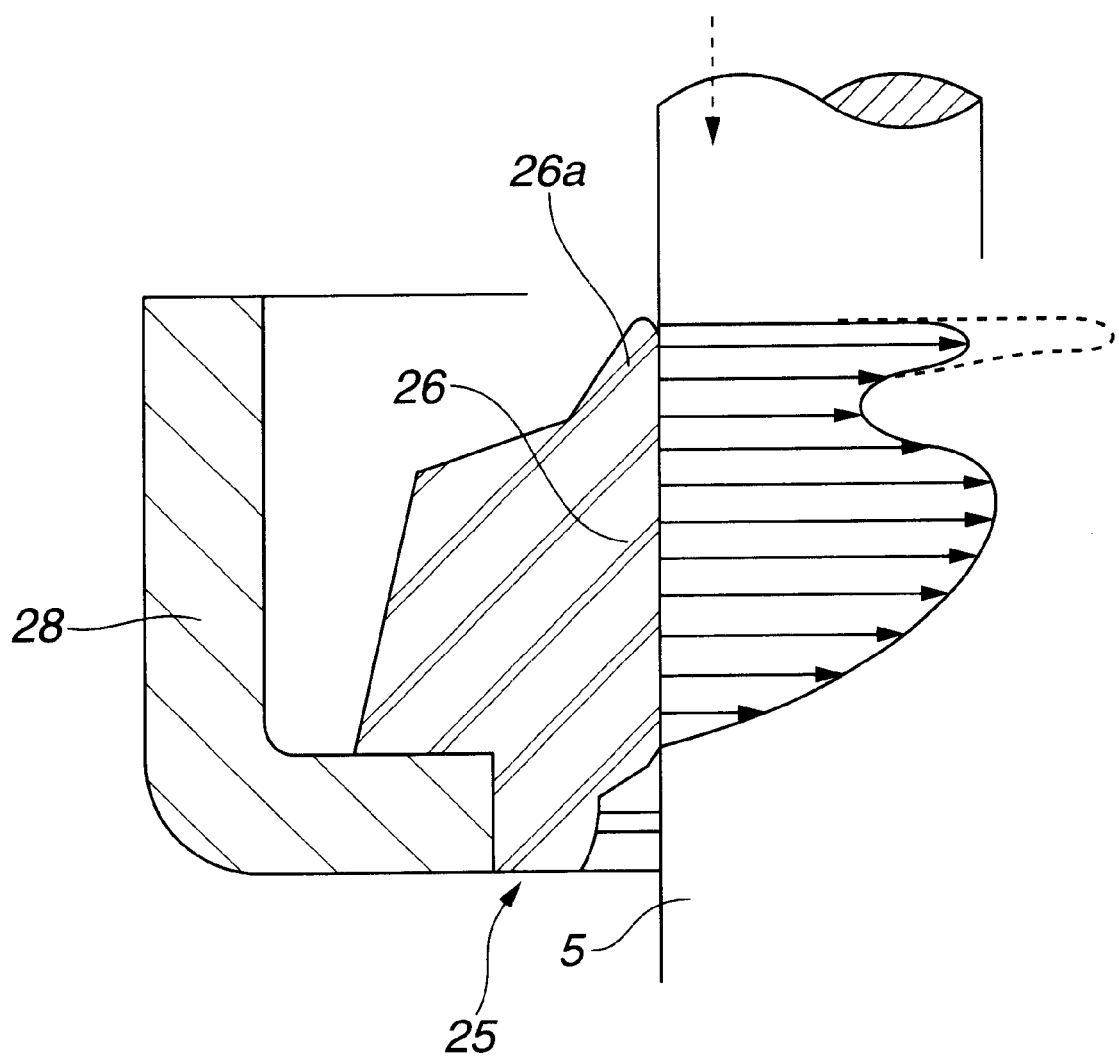
FIG. 21 is a schematic view illustrating the distribution of surface pressure of the friction member on a piston rod in the eleventh embodiment.

FIGS. 20–21 show an eleventh embodiment of the hydraulic damper 1, which is substantially the same as the third embodiment except that the friction element 26 of elastic rubber material has an inner diameter tapered toward the upper end under no-load conditions before mounted to the piston rod 5, and includes at the upper end a low-rigidity portion 26a having greater taper angle.

Referring to FIG. 21, in the eleventh embodiment, due to the above configuration of the friction element 26, when mounted to the piston rod 5, the friction element 26 has upper end largely extended in the outer peripheral direction so that its upper end face is inclined to lower the outer periphery, and the low-rigidity portion 26a having greater taper angle is extended further in the outer peripheral direction.

Regarding the distribution of surface pressure of the friction member 25 on the piston rod 5 when the friction member 25 is mounted thereto, due to lower tightening force, the low-rigidity portion 26a provides, in the stationary state, a lower surface pressure compared with the other portion of the friction element 26 as illustrated by the solid line in FIG. 21. Moreover, the surface pressure is the lowest at the boundary between the low-rigidity portion 26a and the other portion.

On the other hand, when the piston rod 5 is slid downwardly as viewed in FIG. 21, the frictional resistance between the inner peripheral face of the low-rigidity portion 26a and the outer peripheral face of the piston rod 5 operates to make the low-rigidity portion 26a fall inwardly. Thus, the surface pressure of the low-rigidity portion 26a becomes higher than that of the other portion as illustrated by the dotted line in FIG. 21, increasing a tightening force thereof. Moreover, the surface pressure operates to slice an oil film on the slide surface so as to enhance a value of friction coefficient, enabling a stable increase in friction value and dynamic spring constant at slight amplitude in the compression stroke of the hydraulic damper 1.

As described above, the head or upper end of the friction element 26 is formed with the low-rigidity portion 26a, so that friction can be increased on operation or during the compression stroke without increasing a tightening force at a standstill, thereby obtaining an additional effect of improving both stability and continuity or durability of friction.

Figure 22:
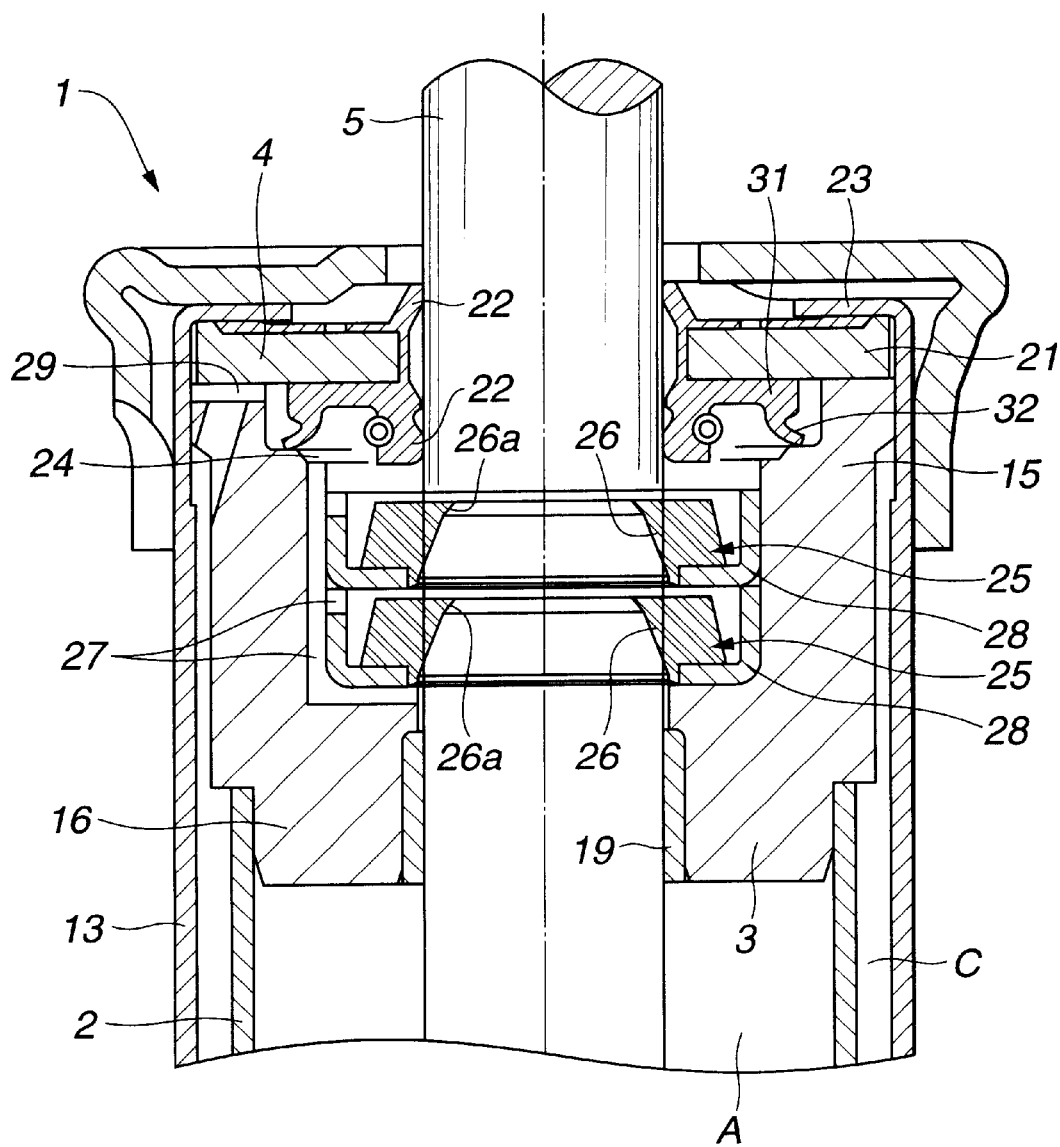
FIG. 22 is a view similar to FIG. 20, showing a twelfth embodiment of the present invention.

FIG. 22 shows a twelfth embodiment of the hydraulic damper 1, wherein two friction members 25 substantially similar to that in the eleventh embodiment are arranged axially. Such combination of a plurality of friction members 25 allows improvement in selection flexibility of the characteristic and adaptation to any required characteristic with reduced number of types of the friction member 25.

Figure 23:
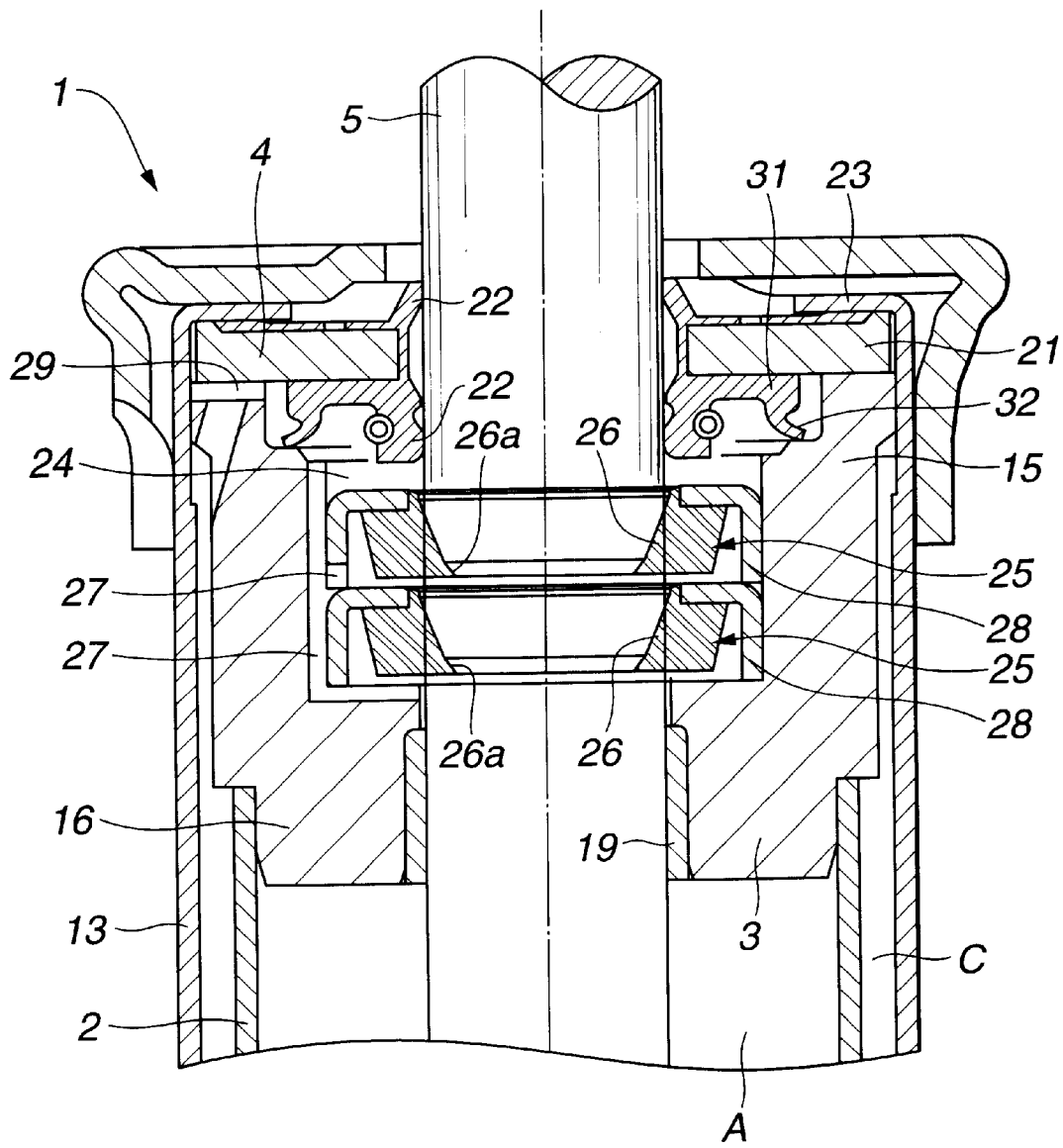
FIG. 23 is a view similar to FIG. 22, showing a thirteenth embodiment of the present invention.

FIG. 23 shows a thirteenth embodiment of the hydraulic damper 1, which is substantially the same as the twelfth embodiment except that the two friction members 25 are arranged in an inverted position. Therefore, the thirteenth embodiment can enhance friction in the expansion stroke of the hydraulic damper 1.

Figure 24:
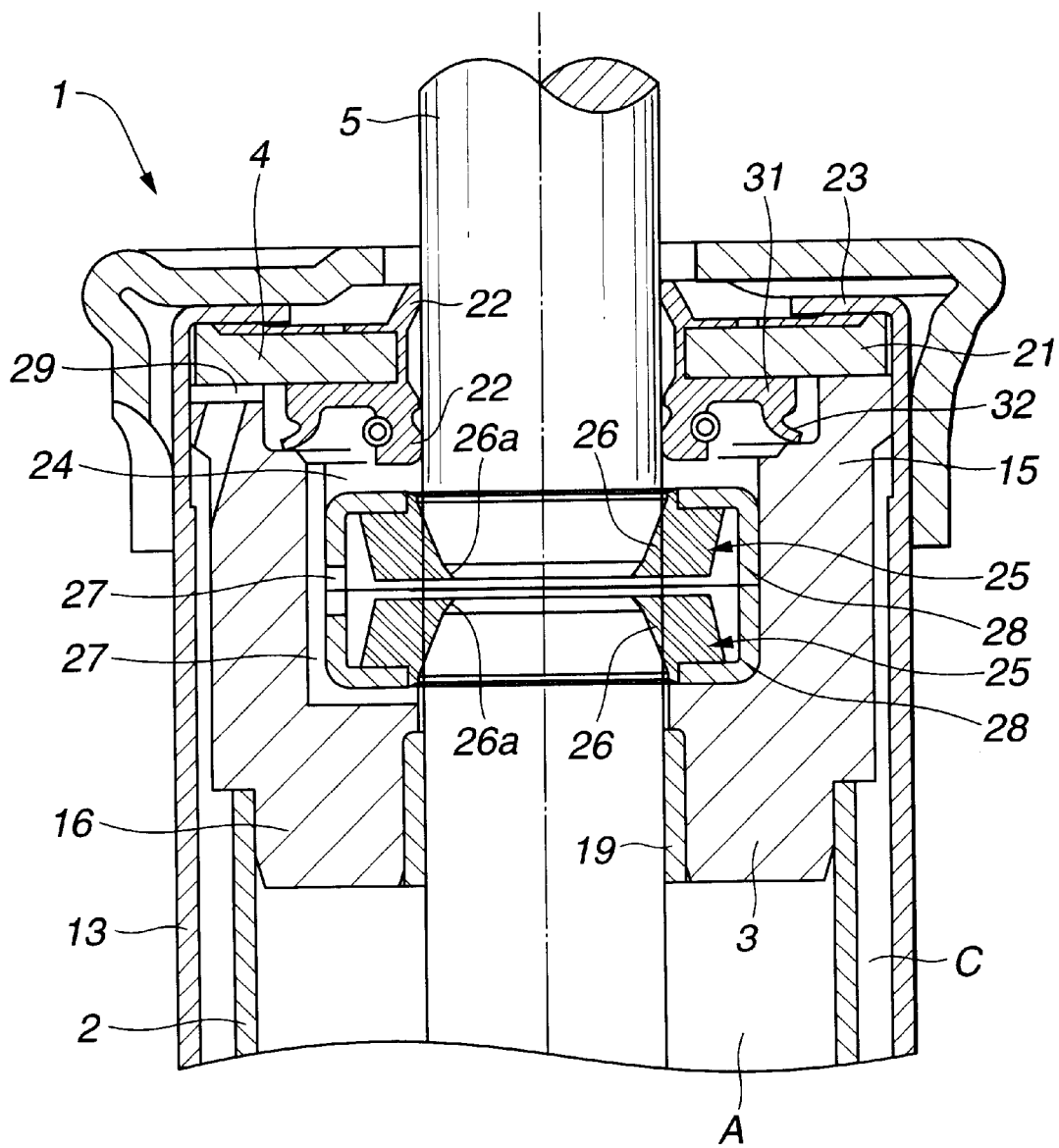
FIG. 24 is a view similar to FIG. 23, showing a fourteenth embodiment of the present invention.

FIG. 24 shows a fourteenth embodiment of the hydraulic damper 1, which is substantially the same as the twelfth embodiment except that only the upper one of the two friction members 25 is arranged in an inverted position. Therefore, the fourteenth embodiment can enhance friction both in the expansion stroke and in the compression stroke of the hydraulic damper 1.

Figure 25:
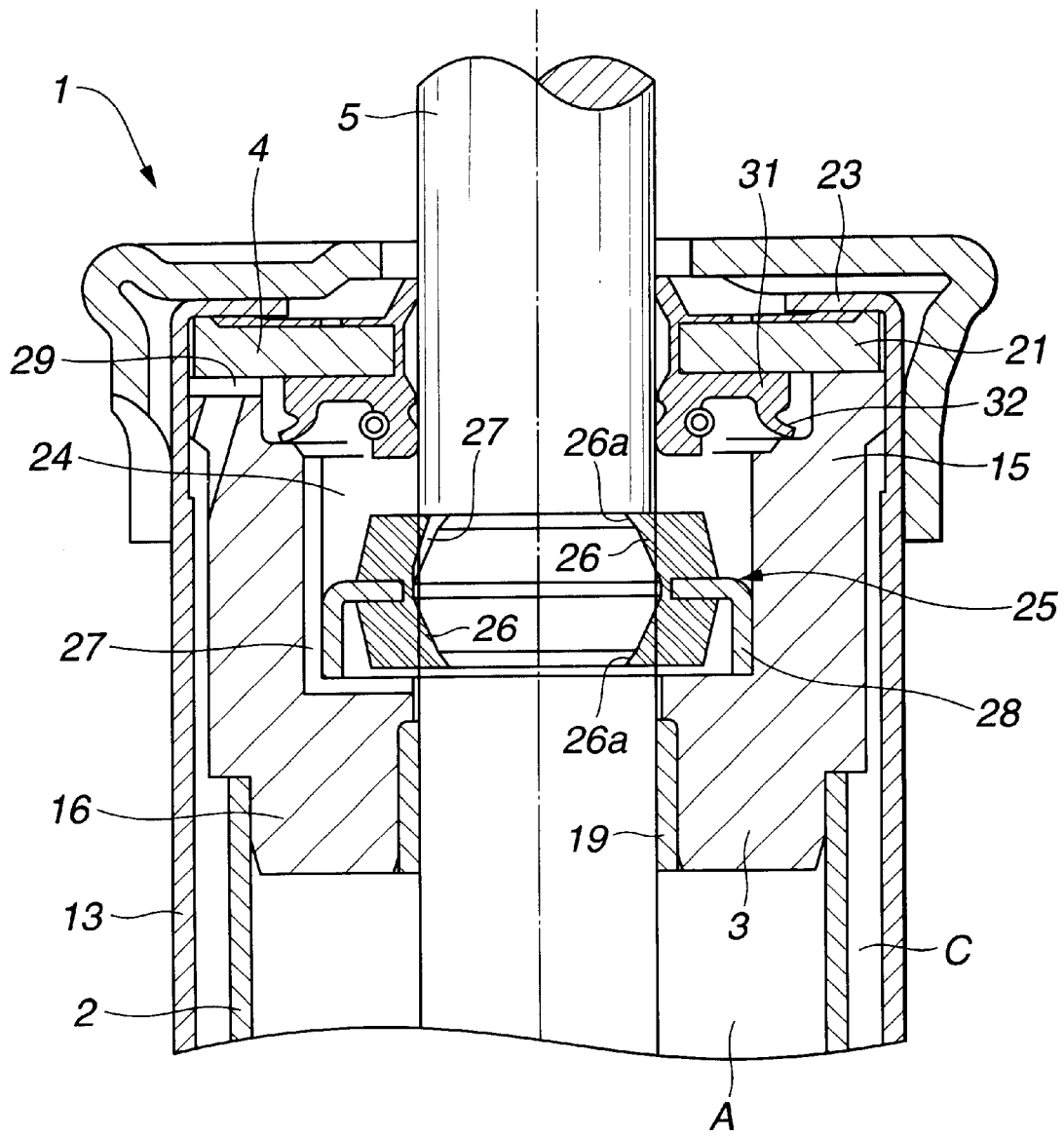
FIG. 25 is a view similar to FIG. 24, showing a fifteenth embodiment of the present invention.

FIG. 25 shows a fifteenth embodiment of the hydraulic damper 1, which is substantially the same as the thirteenth embodiment except that the upper friction member 25 is omitted, and the friction elements 26, 26 opposite in direction are integrated with the metal ring 28 of the lower friction member 25. Moreover, the communicating passage 27 is formed in the inner peripheral face of the upper friction element 26. Therefore, the fifteenth embodiment allows a cost reduction due to reduced number of components.

Figure 26:
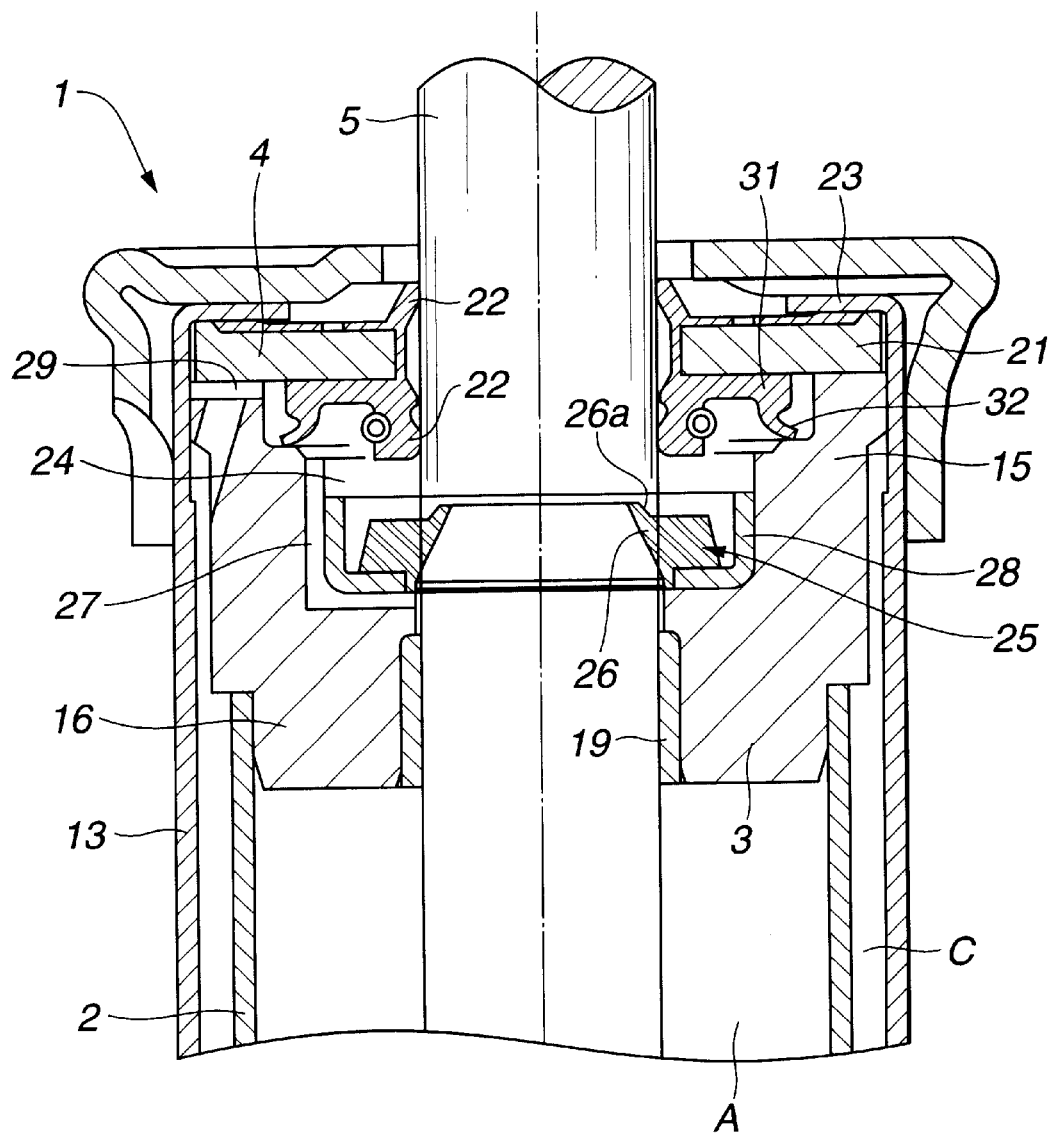
FIG. 26 is a view similar to FIG. 25, showing a sixteenth embodiment of the present invention.
Figure 27:
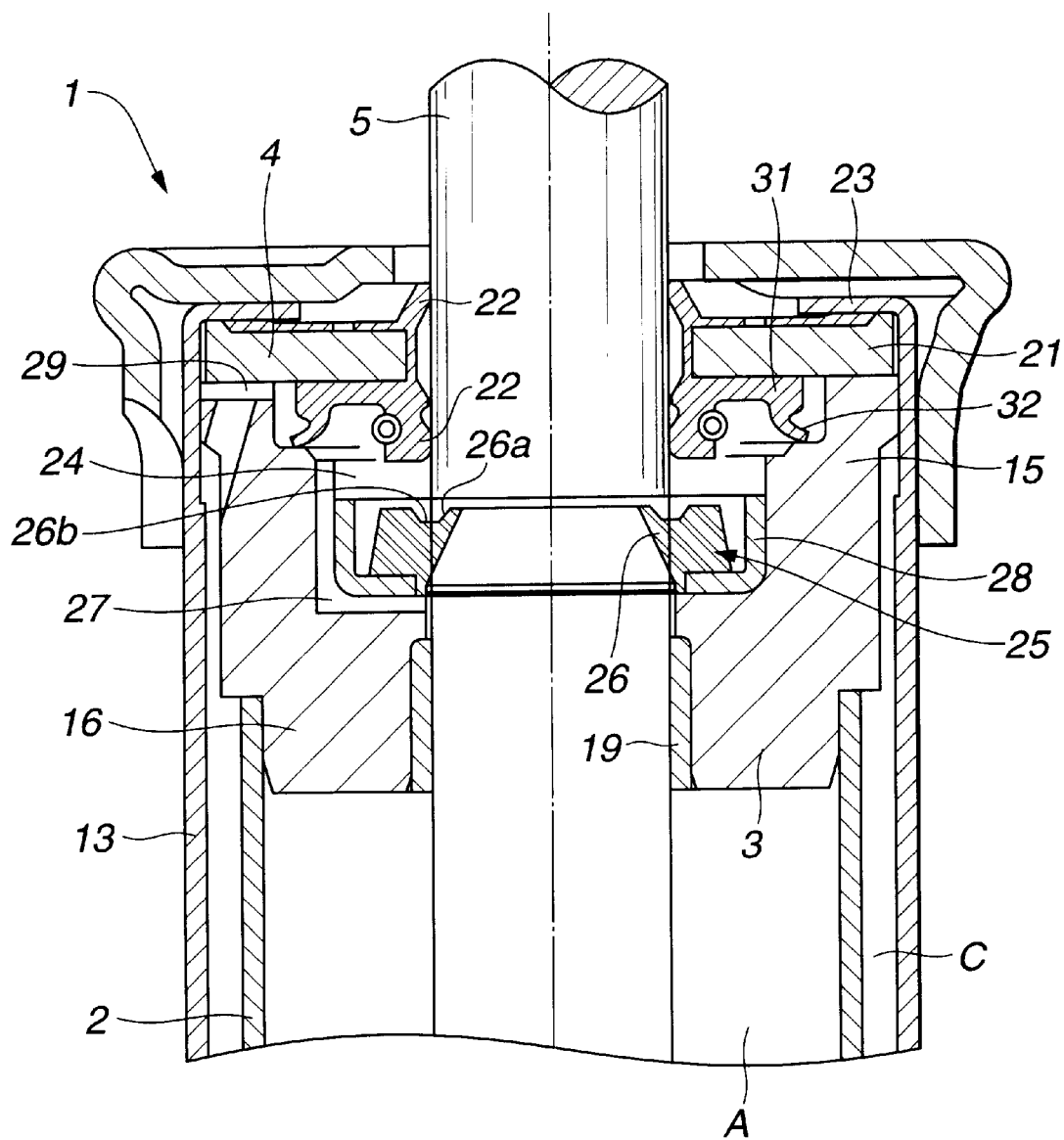
FIG. 27 is a view similar to FIG. 26, showing a seventeenth embodiment of the present invention.
Figure 28:
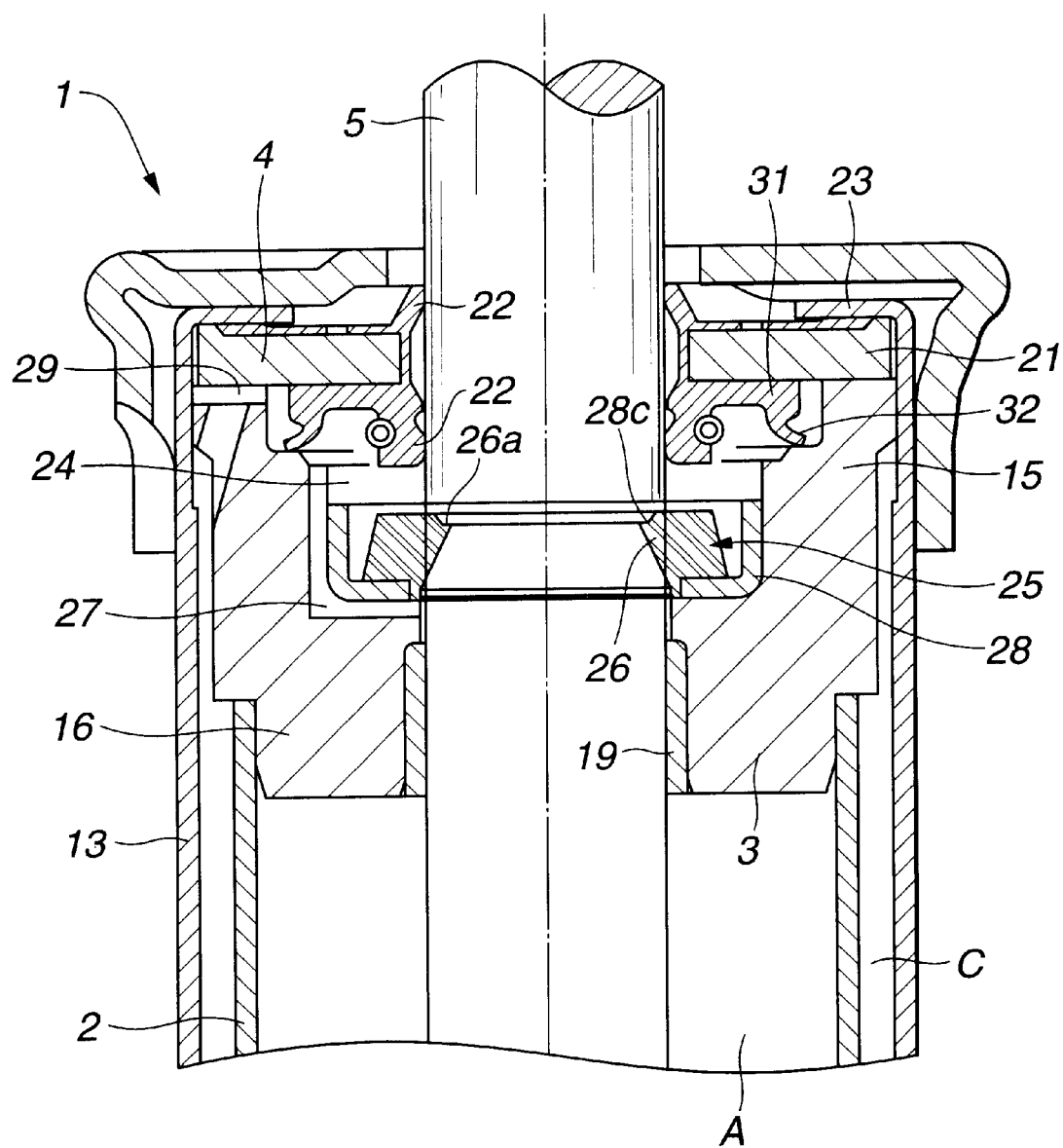
FIG. 28 is a view similar to FIG. 27, showing an eighteenth embodiment of the present invention.

FIGS. 26–28 show sixteenth to eighteenth embodiments of the hydraulic damper 1, each being an alternative of the low-rigidity portion 26a of the friction element 26 in the first embodiment.

Referring to FIG. 26, in the sixteenth embodiment, the inner peripheral edge of the friction element 26 is formed to protrude upwardly inwardly from the upper end so as to serve as the low-rigidity portion 26a.

Referring to FIG. 27, in the seventeenth embodiment, an annular groove 26b is formed in the upper end face of the friction element 26 at a position close to the inner peripheral edge. A protrusion placed inwardly with respect to the annular groove 26b serves as the low-rigidity portion 26a.

Referring to FIG. 28, in the eighteenth embodiment, in order that the inner peripheral edge of the upper end face of the friction element 25 may be lower than the other portion thereof, an annular recess 26c is formed in the upper end face of the friction element 26 at the inner peripheral edge. The inner peripheral edge of the annular recess 26c serves as the low-rigidity portion 26a.

Figure 29:
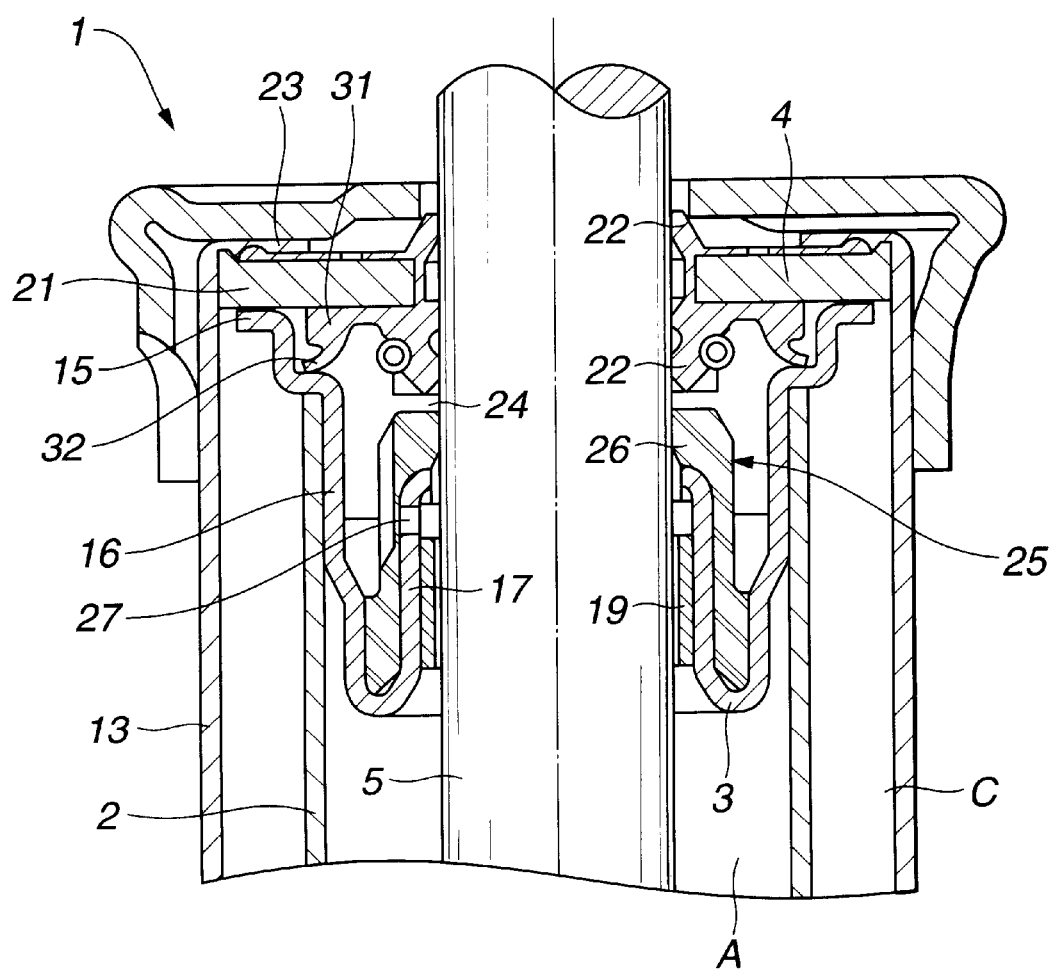
FIG. 29 is a view similar to FIG. 28, showing a nineteenth embodiment of the present invention.

FIG. 29 shows a nineteenth embodiment of the hydraulic damper 1, wherein the rod guide 3 is obtained by press working of a steel sheet material in the same way as in the first embodiment, and the friction element 26 of elastic rubber material constituting the friction member 25 is integrated with the upper end of the inner-diameter portion 17 of the rod guide 3. The communicating passage 27 is formed in the inner-diameter portion 17 to equalize the pressure acting on both axial sides of the friction member 25.

Figure 30:
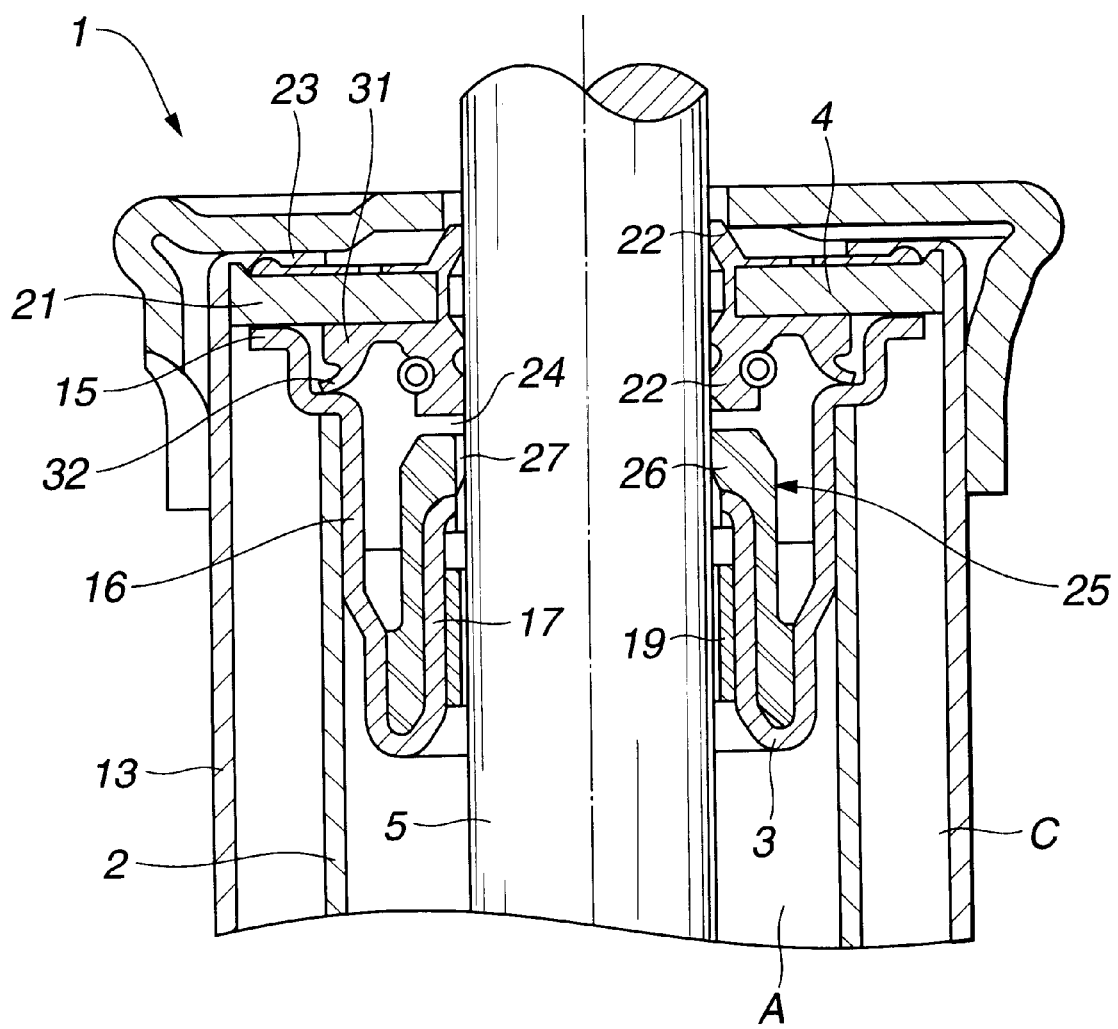
FIG. 30 is a view similar to FIG. 29, showing a twentieth embodiment of the present invention.

FIG. 30 shows a twentieth embodiment of the hydraulic damper 1, which is substantially the same as the first embodiment except that the communicating passage 27 is formed in the inner peripheral face of the friction element 26.

Figure 31:
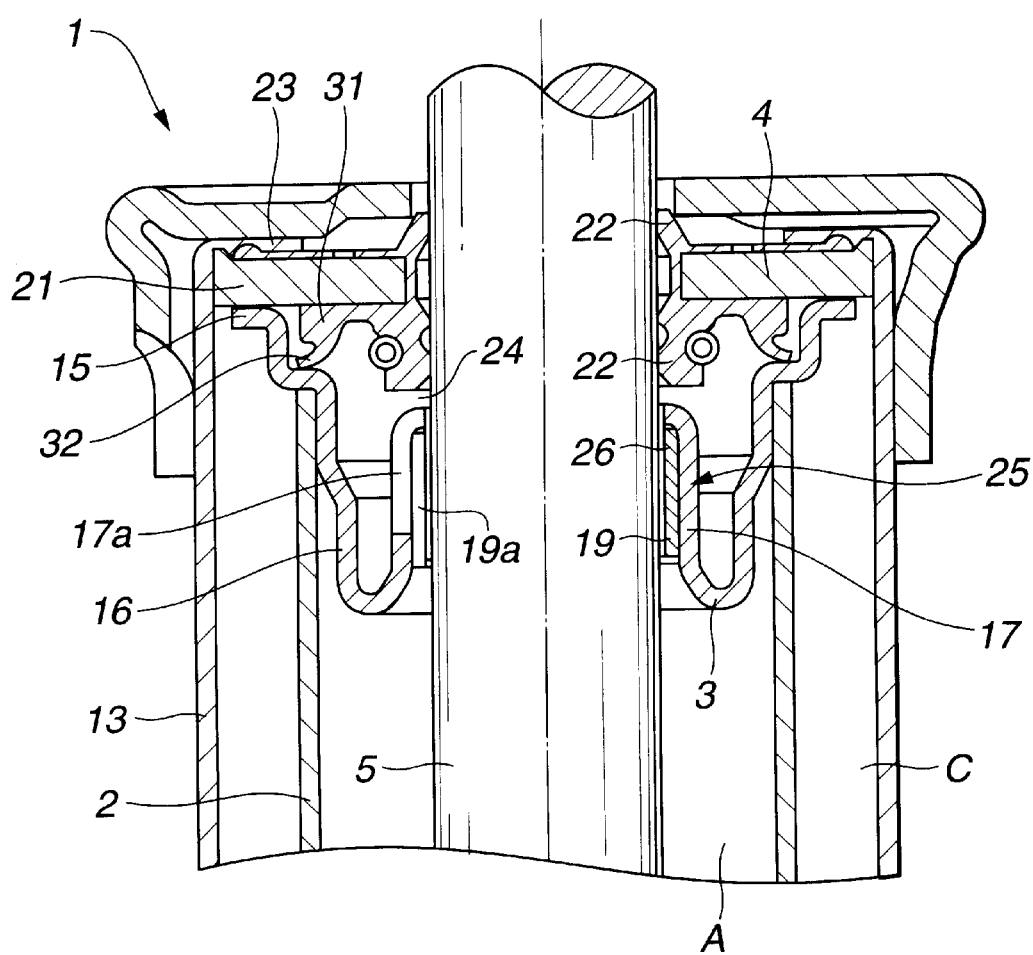
FIG. 31 is a view similar to FIG. 30, showing a twenty-first embodiment of the present invention.
Figure 32:
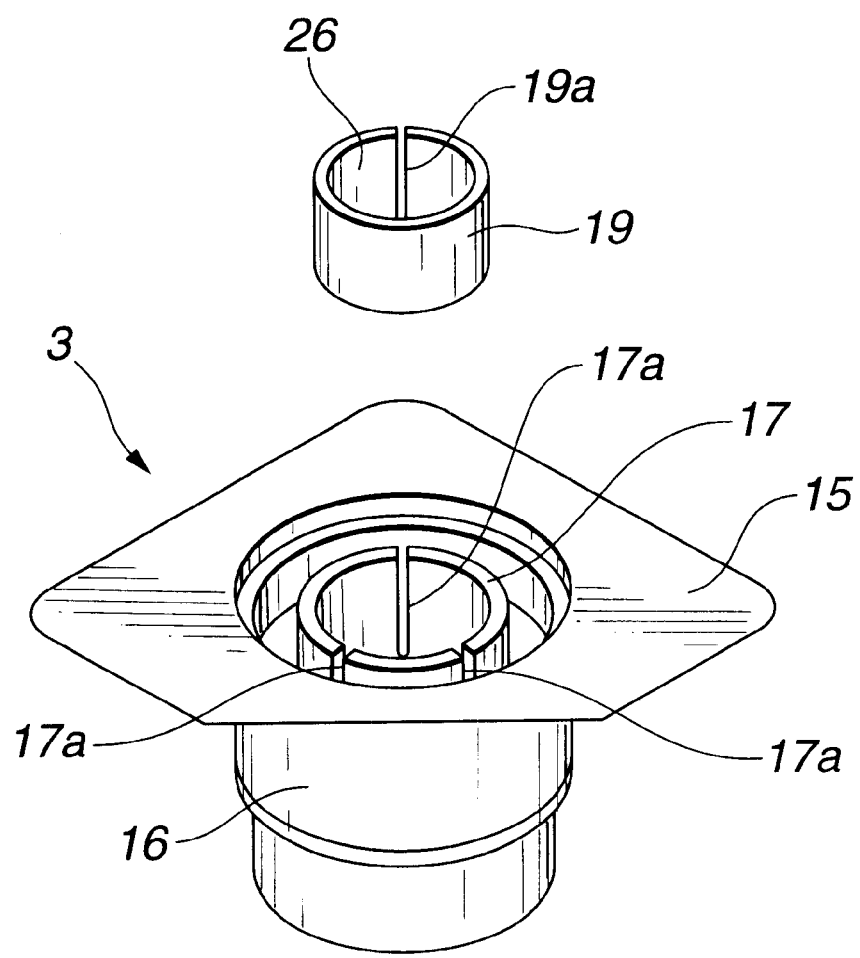
FIG. 32 is an exploded perspective view showing the friction member in the twenty-first embodiment.

FIGS. 31–32 show a twenty-first embodiment of the hydraulic damper 1, wherein the rod guide 3 is obtained by press working of a sheet material in the same way as in the nineteenth embodiment, and the friction member 25 comprises part of the guide bush 19 arranged at the inner periphery of the inner-diameter portion 17 of the rod guide 3.

Specifically, referring to FIG. 32, the rod guide 3 is formed out of a sheet material with a predetermined elasticity, and has three axial slits 17a formed in an upper part of the inner-diameter portion 17. The guide bush 19 is formed like a cylinder having an axial recess 19a. By an inward tightening force previously provided to the part with slits 27a of the inner-diameter portion 17, an upper portion of the guide bush 19 is biased to elastically contact the outer peripheral face of the piston rod 5.

Therefore, a lower portion of the guide bush 19 serves as a proper guide bush 19 for guiding in-and-out movement of the piston rod 5, whereas the upper portion of the guide bush 19 serves as a friction member 25 or a friction element 26 for producing friction.

Figure 33:
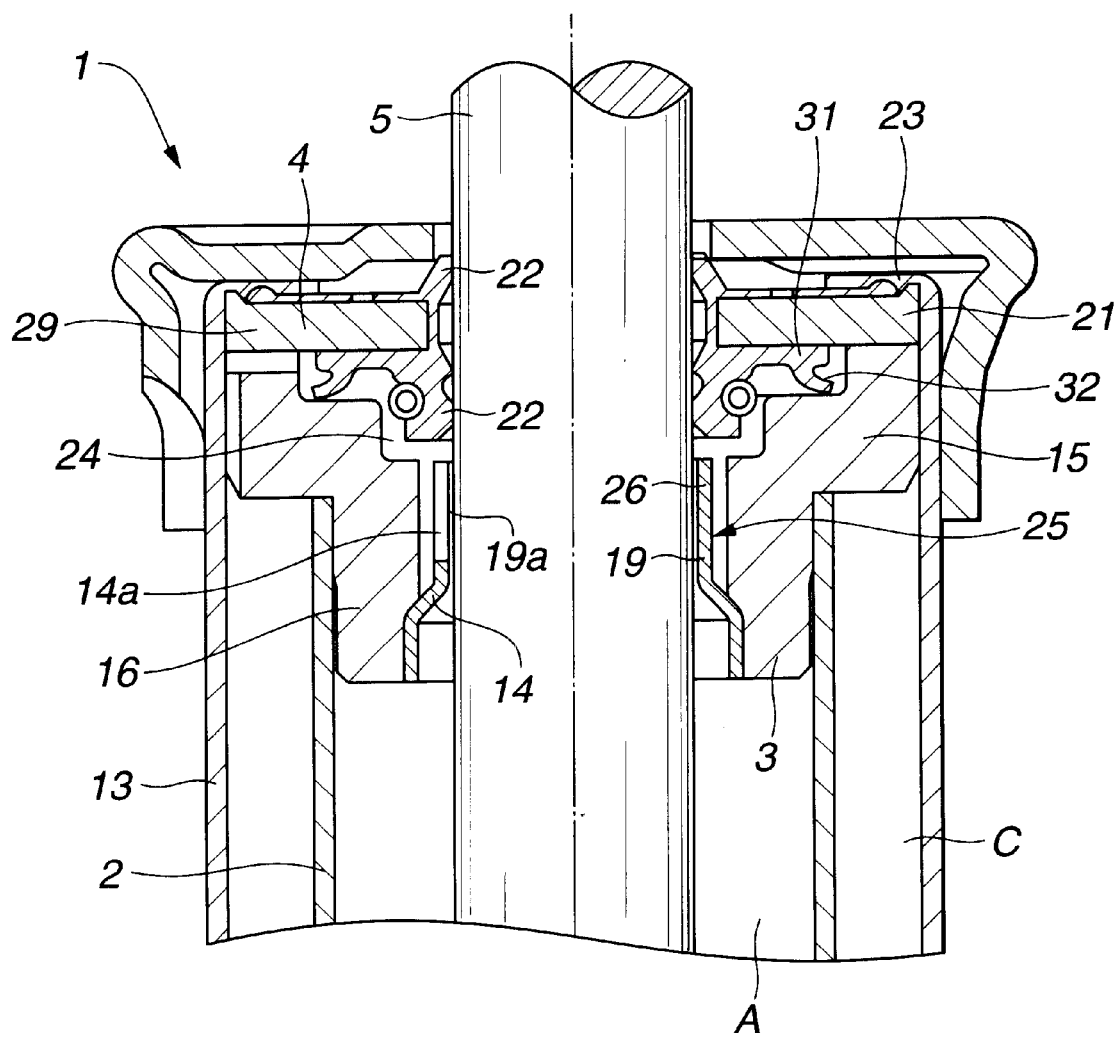
FIG. 33 is a view similar to FIG. 31, showing a twenty-second embodiment of the present invention.
Figure 34:
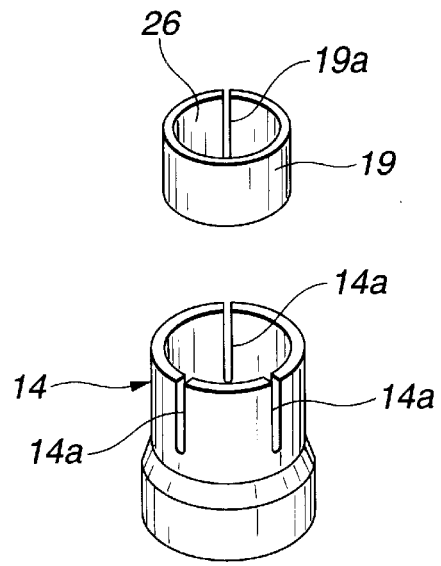
FIG. 34 is a view similar to FIG. 32, showing the friction member in the twenty-second embodiment.

FIGS. 33–34 show a twenty-second embodiment of the hydraulic damper 1, wherein the rod guide 3 is obtained by machining or formed out of sintered metal in the same way as in the third embodiment, and the guide bush 19 is arranged inwardly with respect to the rod guide 3 through a housing 14, part of which serves as the friction member 25.

Specifically, referring to FIG. 34, the housing 14 is formed out of a sheet material with a predetermined elasticity and like a different-diameter cylinder having smaller-diameter upper portion. A larger-diameter portion of the housing 14 is secured to the inner periphery of the lower end of the rod guide 3. The smaller-diameter portion of the housing 14 has three axial slits 14*a* formed in an upper part. The guide bush 19 is arranged in the smaller-diameter portion of the housing 14, and is formed like a cylinder having axial recess 19*a*. By an inward tightening force previously provided to the part with slits 14*a* of the smaller-diameter portion of the housing 14, the upper portion of the guide bush 19 is biased to elastically contact the outer peripheral face of the piston rod 5.

Therefore, the lower portion of the guide bush 19 serves as a proper guide bush 19 for guiding in-and-out movement of the piston rod 5, whereas the upper portion of the guide bush 19 serves as a friction member 25 or a friction element 26 for producing friction.

Figure 35:
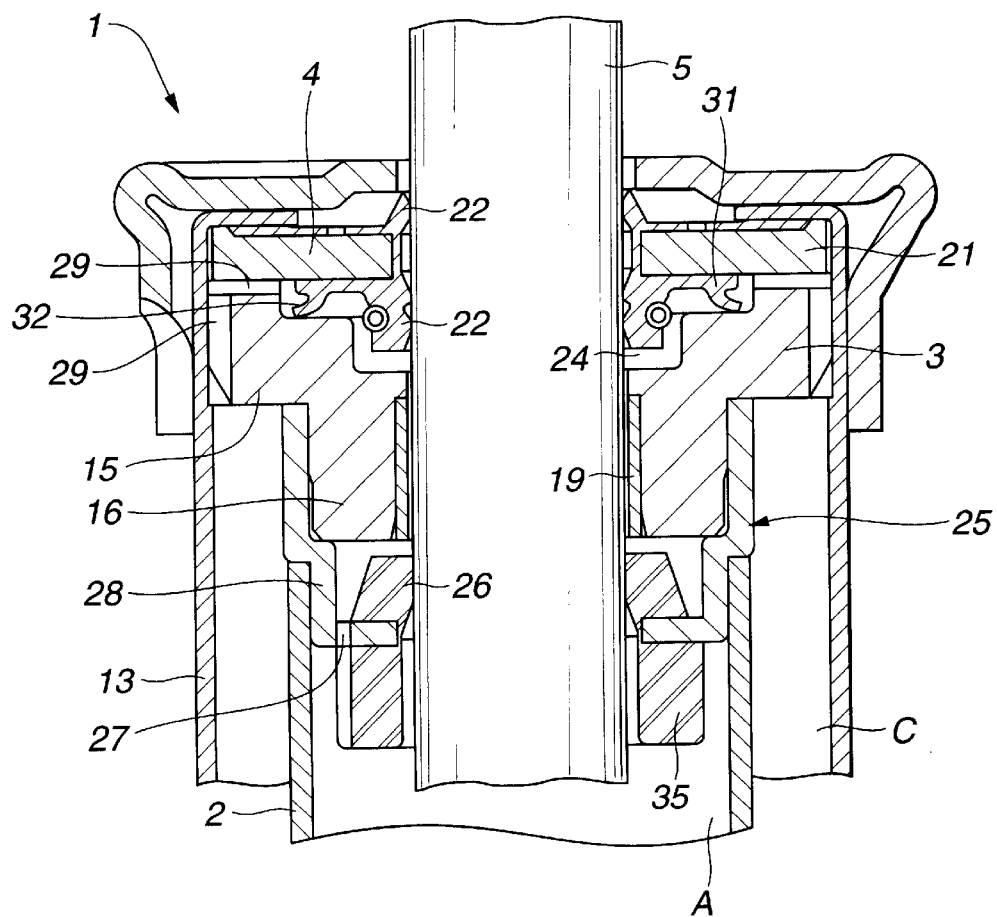
FIG. 35 is a view similar to FIG. 33, showing a twenty-third embodiment of the present invention.

FIG. 35 shows a twenty-third embodiment of the hydraulic damper 1, wherein the rod guide 3 is obtained by machining or formed out of sintered metal, and the friction member 25 is arranged between the rod guide 3 and the cylinder 2. Specifically, the metal ring 28 of the friction member 25 is engaged with the smaller-diameter portion 16 of the rod guide 3, and the cylinder 2 is engaged with the metal ring 28 of the friction member 25. Moreover, a rebound stopper 35 is formed with the friction member 25.

Figure 36:
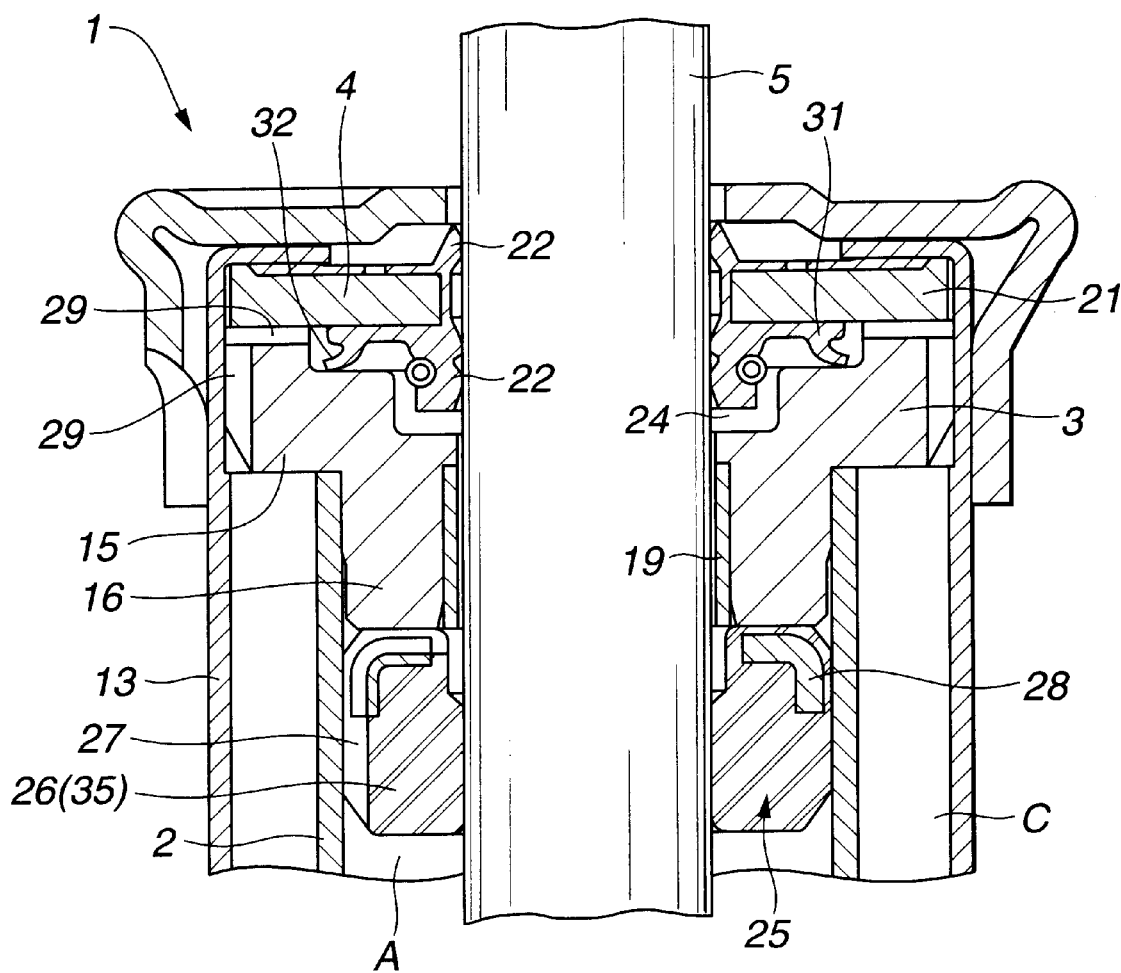
FIG. 36 is a view similar to FIG. 35, showing a twenty-fourth embodiment of the present invention.

FIG. 36 shows a twenty-fourth embodiment of the hydraulic damper 1, wherein the rod guide 3 is obtained by machining or formed out of sintered metal, and the friction member 25 is arranged below the rod guide 3 and within the cylinder 2. Moreover, the rebound stopper 35 is integrated with the friction element 26.

The friction member 25 comprises a friction element 26 elastically contacting the inner peripheral face of the cylinder 2 and a communication passage 27 for equalizing the pressure acting on both axial sides of the friction element 26. The friction member 25 is configured such that the friction element 26 is arranged at the outer periphery of the metal ring 28 to elastically contact the inner peripheral face of the cylinder 2, and the metal ring 28 is secured to the piston rod 5.

Figure 37:
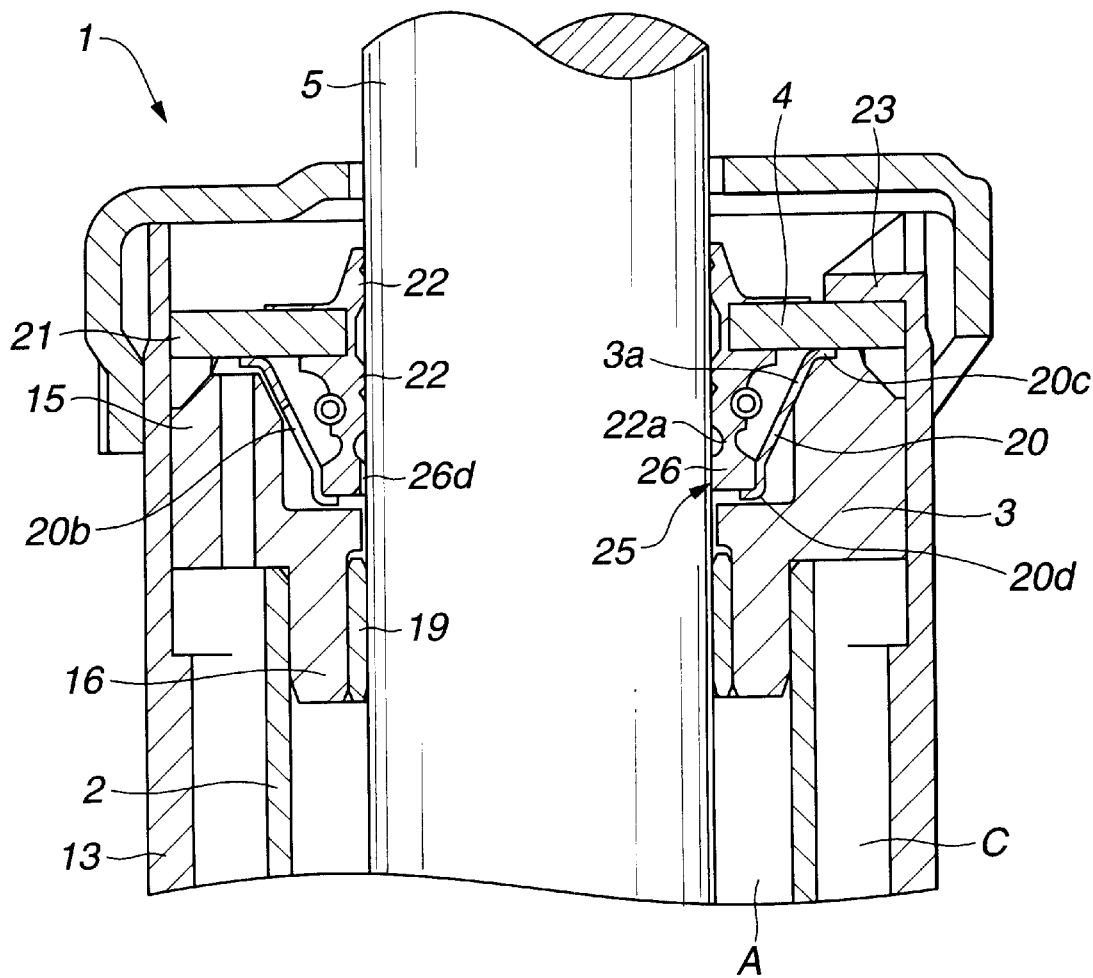
FIG. 37 is a view similar to FIG. 36, showing a twenty-fifth embodiment of the present invention.
Figure 38:
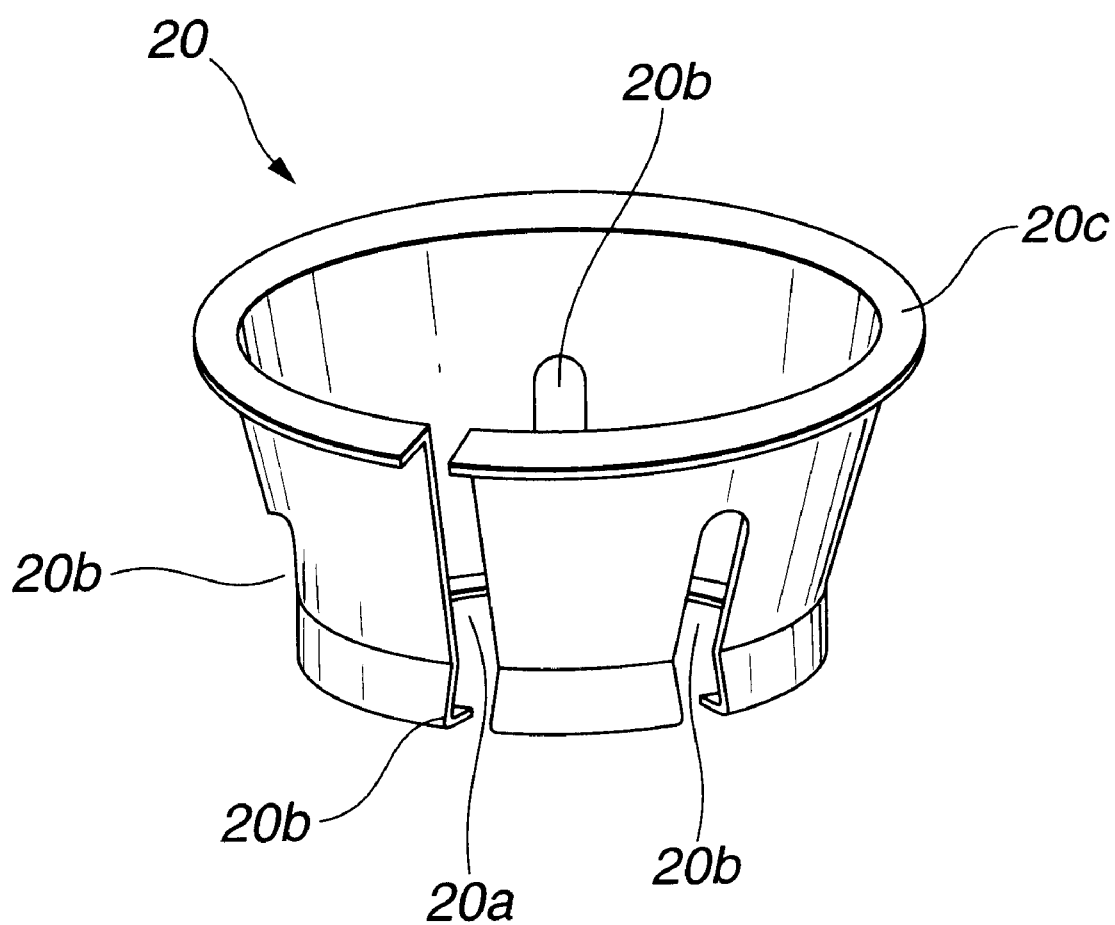
FIG. 38 is a view similar to FIG. 17, showing an elastic member in the twenty-fifth embodiment.
Figure 39:
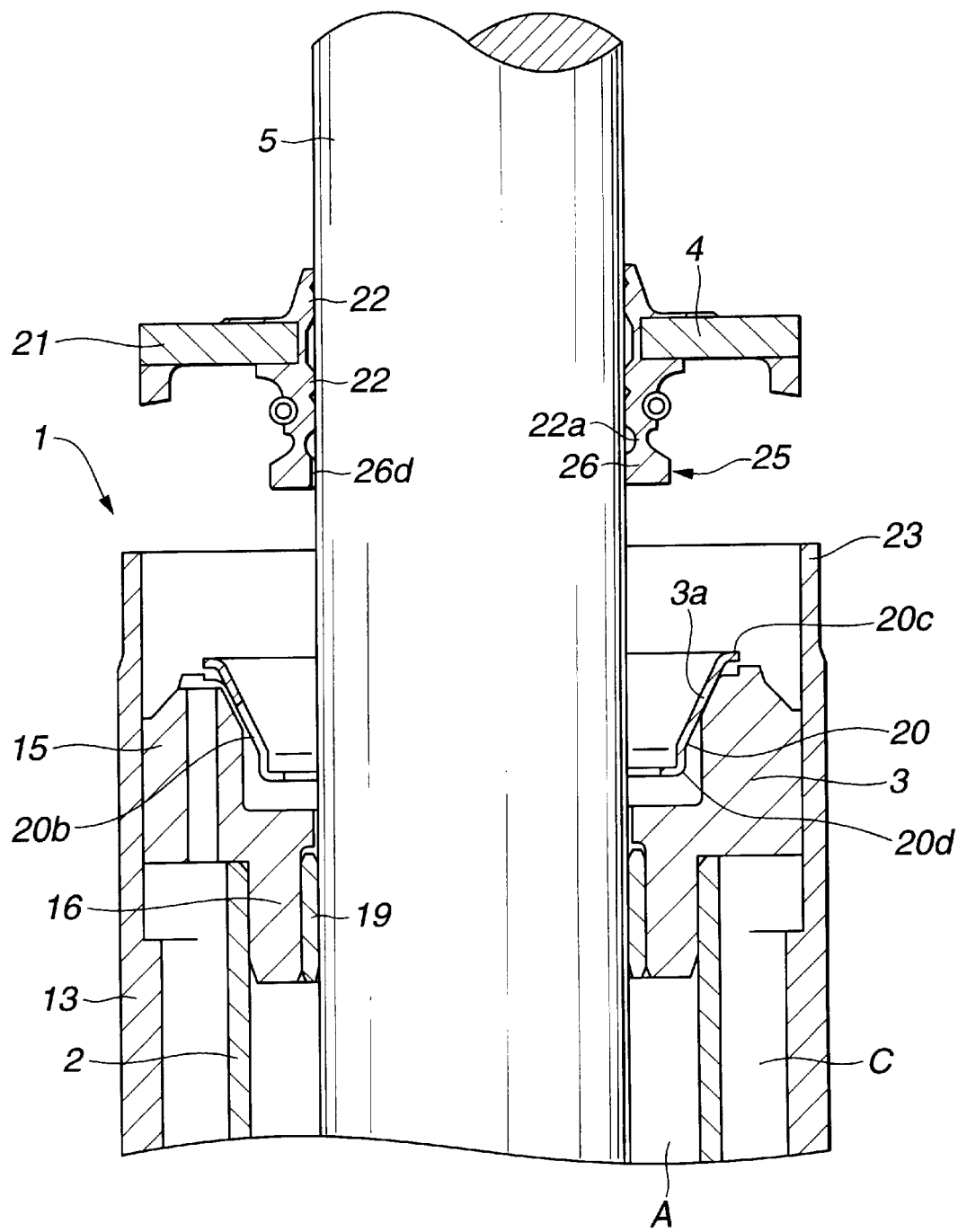
FIG. 39 is a view similar to FIG. 37, showing a mounting process of the hydraulic damper in the twenty-fifth embodiment.

FIGS. 37–39 show a twenty-fifth embodiment of the hydraulic damper 1, wherein the friction member 25 is integrated with the seal lip 22 and of the seal member 4. Specifically, referring to FIG. 37, the friction element 26 is formed with a lower portion of the seal lip 22 through a thin-walled portion 22*a*, and an elastic member 20 is arranged at the inner periphery of the rod guide 3 to bias the friction element 26 toward the outer peripheral face of the piston rod 5 for elastic contact therewith. An axial groove 26*d* is formed in the inner peripheral face of the friction element 26 to secure oil lubrication for the seal lip 22.

Referring to FIG. 38, the elastic member 20 is formed out of a sheet material with a predetermined elasticity and like a cylinder tapered toward a lower end and with an axial recess 20*a*. Three axial slits 20*b* are formed in a lower part of the elastic member 20. Moreover, the elastic member 20 has an outward flange 20*c* formed at the upper-end edge. The upper end of the elastic member 20 is secured by holding the flange 20*c* between the metal ring 21 of the seal member 4 and the rod guide 3, and the upper part is supported by a tapered portion 3*a* formed at the inner periphery of the upper end of the rod guide 3. The friction element 26 is disposed inwardly with respect to a support 20*d* of L-shaped section formed at the lower end of the elastic member 20.

Referring to FIG. 39, the elastic member 20 is mounted to the rod guide 3 at the inner periphery thereof, and then the seal member 4 is mounted thereto. The dimension of the elastic member 20 is designed such that before mounting the seal member 4, the flange 20*c* of the elastic member 20 is positioned slightly above the top face of the rod guide 3. In this state, when moving the seal member 4 downwardly for mounting, the friction element 26 is press fitted into the L-shaped section support 20*d* of the elastic member 20. Then, the metal ring 21 of the seal member 4 abuts on the flange 20*c* positioned slightly above the top face of the rod guide 3 to move the whole elastic member 20 downwardly. This reduces the diameter of the whole elastic member 20 along the tapered-wall portion 3*a* of the rod guide 3, providing thrust to make the friction element 26 elastically contact the outer peripheral face of the piston rod 5.

Therefore, the twenty-fifth embodiment can produce the following additional effects:

First, integration of the friction member 25 with the seal lip 22 of the seal member 4 allows a cost reduction;

Second, since the thin-wall portion 22*a* is formed between the seal lip 22 and the friction member 25, the friction member 25 can be integrated with the seal lip 22 without affecting the performance thereof;

Third, since the elastic member 20 can produce stable and high friction in the mounted state, setting of the elastic member 20 allows any change in the magnitude of friction; and Fourth, since the friction member 25 undergoes thrust to elastically contact the outer peripheral face of the piston rod 5 only after mounting, larger interference is not needed before mounting, resulting excellent mounting-ability.

FIGS. 40–47 show twenty-sixth to thirty-third embodiments of the hydraulic damper 1, wherein the friction member 25 is mounted to the piston rod 5 on the side adjacent to the piston 8, and the outer peripheral face of the friction element 26 is disposed to elastically contact the inner peripheral face of the cylinder 2 so as to provide a given friction to the slide movement of the piston 8. The friction member 25 is configured such that friction produced at the friction member 25 is greater than that produced at the piston ring 6, obtaining less influence resulting from friction produced at the piston ring 6 and thus restrained wear of the piston ring 6. The rebound stopper 35 is mounted to the piston rod 5.

Figure 40:
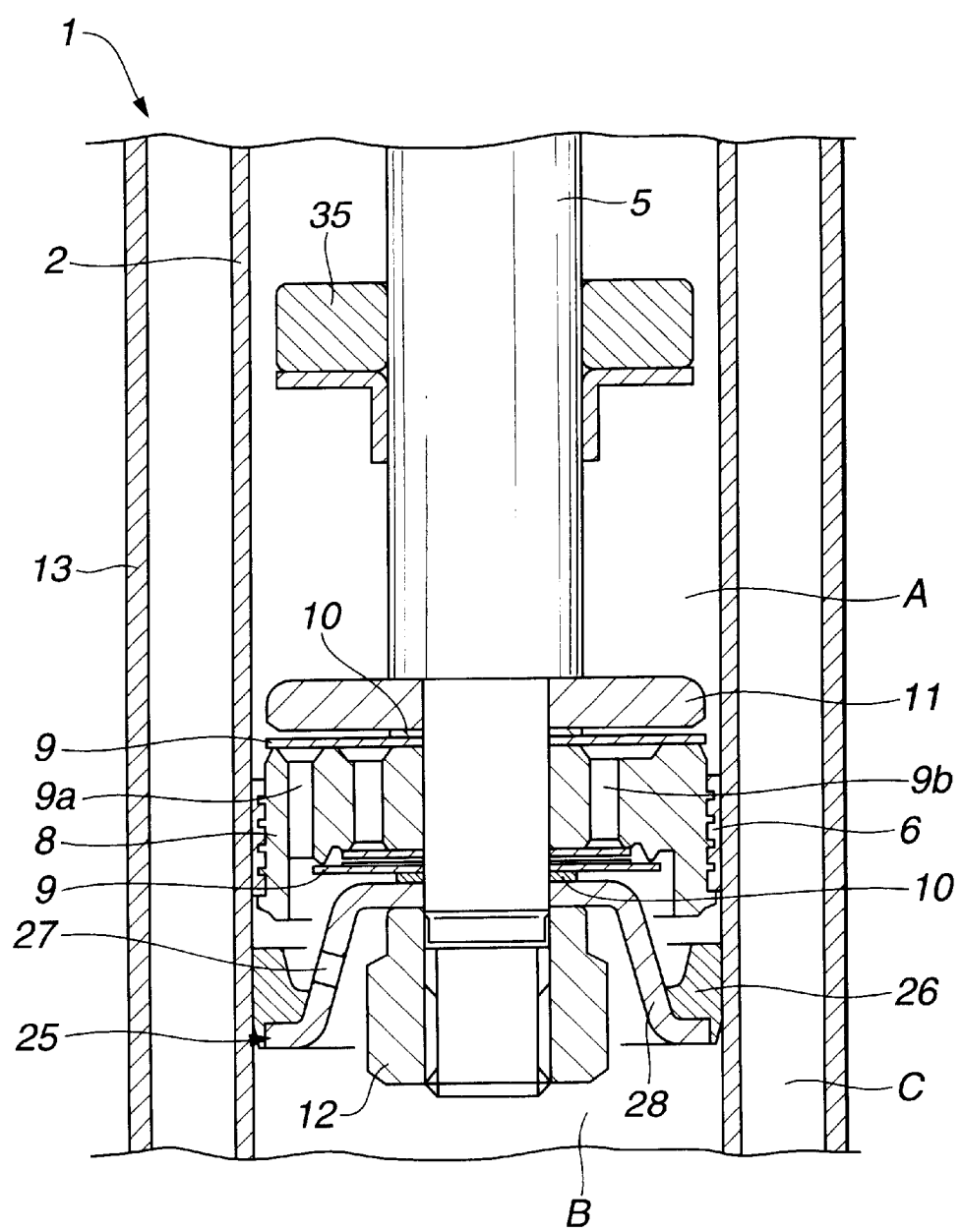
FIG. 40 is a view similar to FIG. 39, showing a twenty-sixth embodiment of the preset invention.
Figure 41:
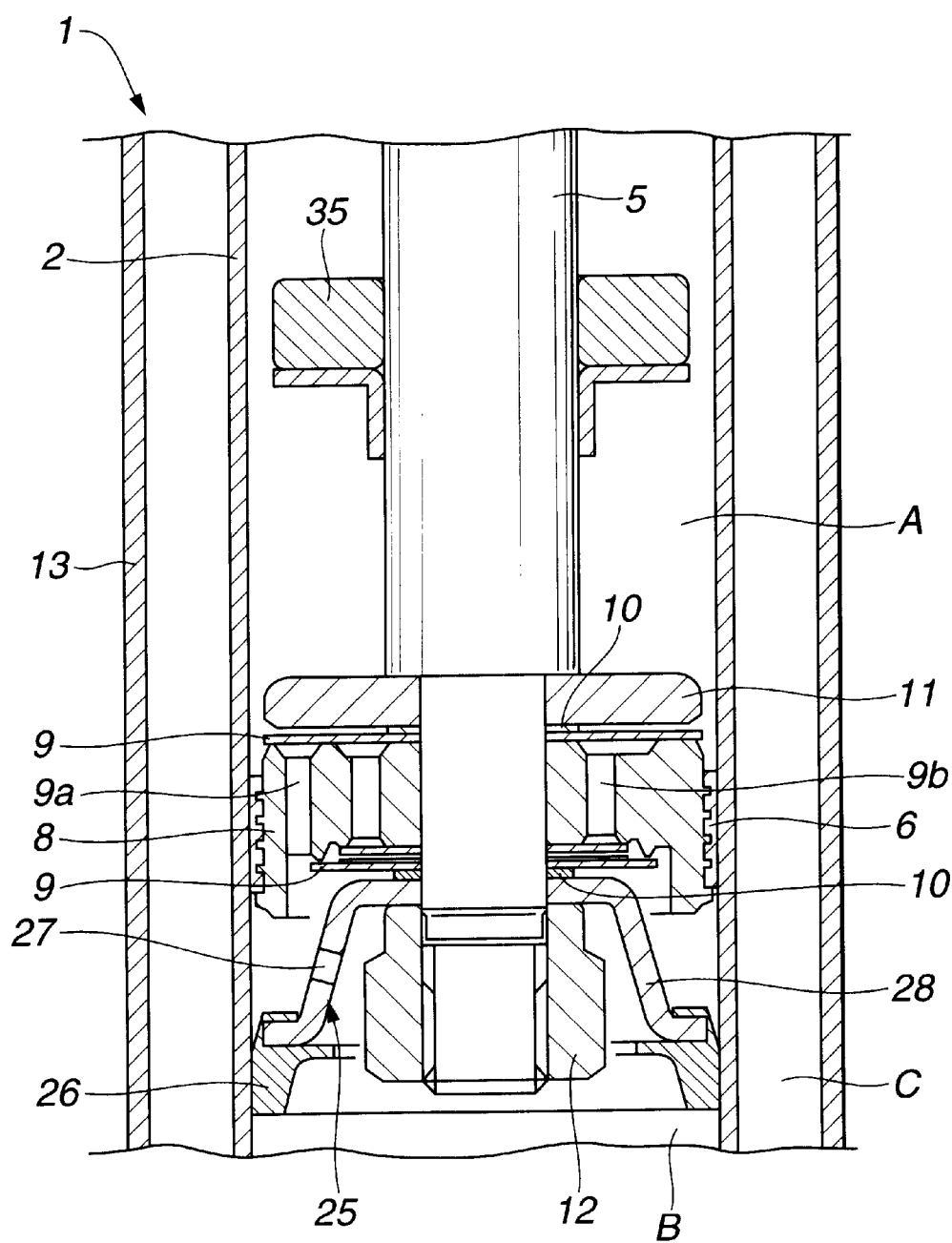
FIG. 41 is a view similar to FIG. 40, showing a twenty-seventh embodiment of the preset invention.

Referring to FIGS. 40–41, with the hydraulic damper 1 in the twenty-sixth and twenty-seventh embodiments, the friction member 25 is secured to the lower side of the piston 8. Specifically, the metal ring 28 of the friction member 25 is disposed below the washers 10, 10 holding the damping-force valves 9, 9 of the piston 8, and is secured to the piston rod 5 together with the damping-force valves 9, 9 by the nut 12. In the twenty-sixth embodiment as illustrated in FIG. 40, the friction element 26 is disposed close to the piston 8, whereas in the twenty-seventh embodiment as illustrated in FIG. 41, the friction element 26 is disposed distant from the piston 8.

Figure 42:
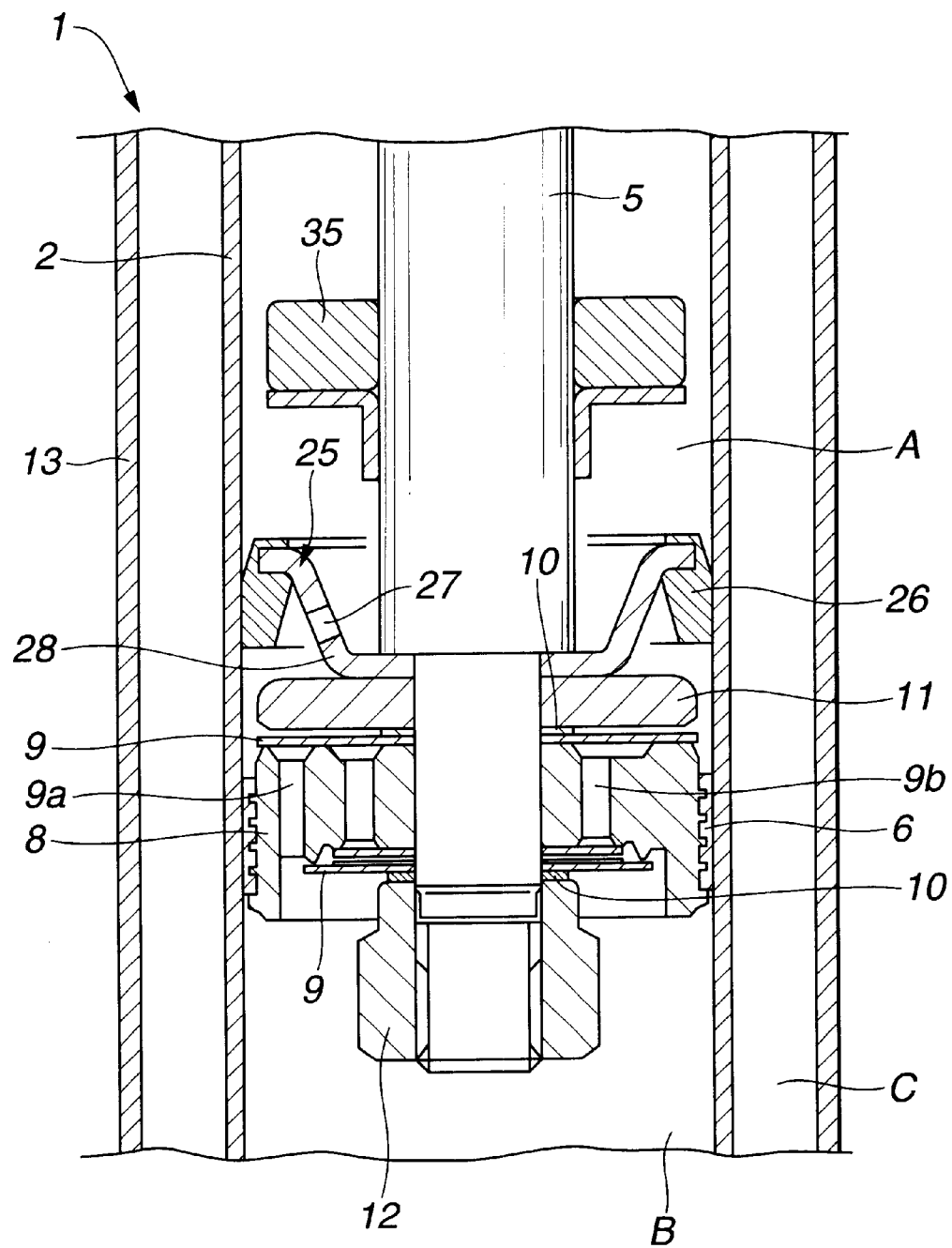
FIG. 42 is a view similar to FIG. 41, showing a twenty-eighth embodiment of the preset invention.
Figure 43:
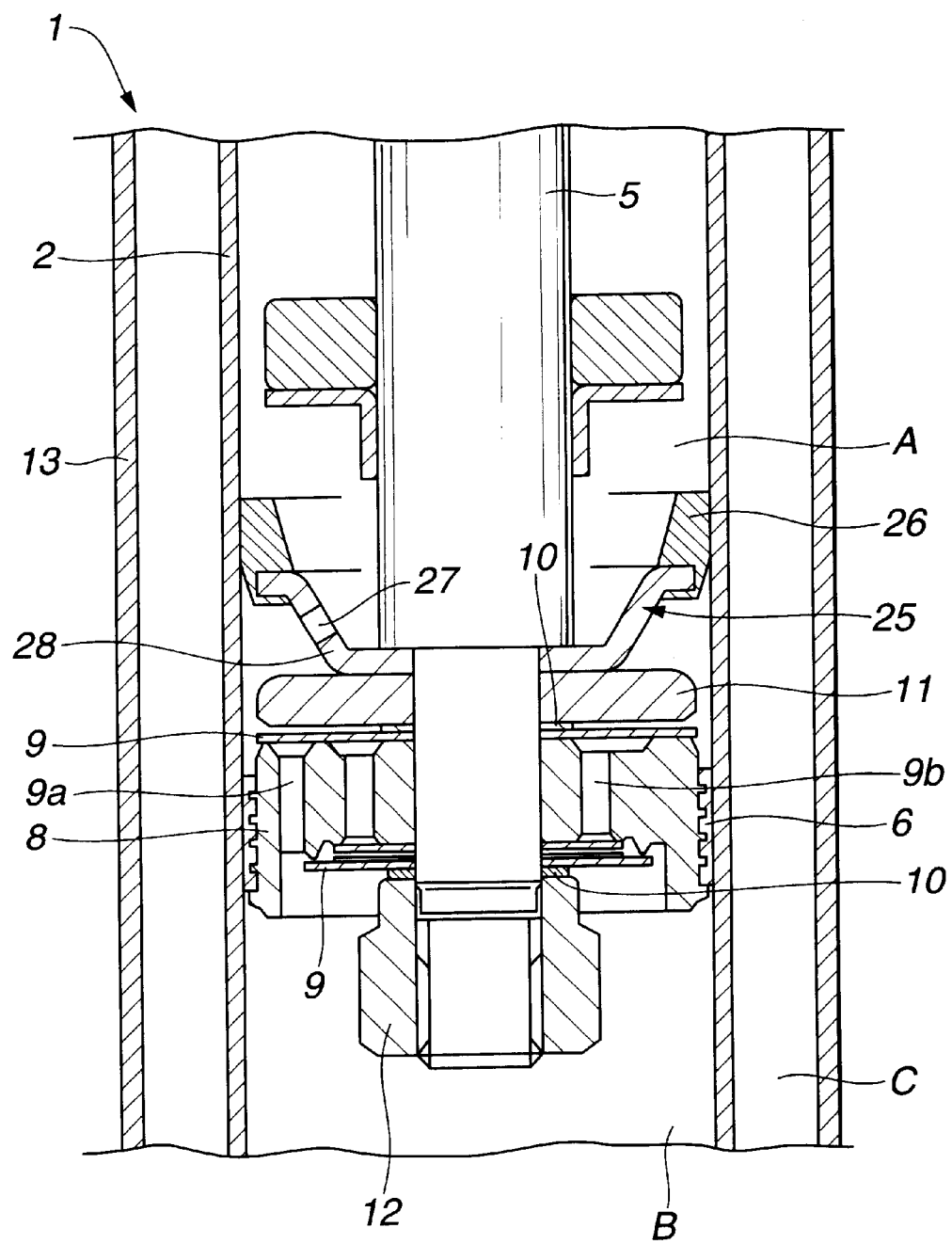
FIG. 43 is a view similar to FIG. 42, showing a twenty-ninth embodiment of the preset invention.

Referring to FIGS. 42–43, with the hydraulic damper 1 in the twenty-eighth and twenty-ninth embodiments, wherein the friction member 25 is secured to the upper side of the piston 8. Specifically, the metal ring 28 of the friction member 25 is disposed above the auxiliary plate 11 for holding the damping-force valve 9 of the piston 8, and is secured to the piston rod 5 together with the damping-force valves 9, 9 by the nut 12. In the twenty-eighth embodiment as illustrated in FIG. 42, the friction element 26 of the friction member 25 is disposed close to the piston 8, whereas in the twenty-ninth embodiment as illustrated in FIG. 43, the friction element 26 is disposed distant from to the piston 8. Optionally, in the twenty-eighth and twenty-ninth embodiments, the friction member 25 may be integrated with the rebound stopper 35.

Figure 44:
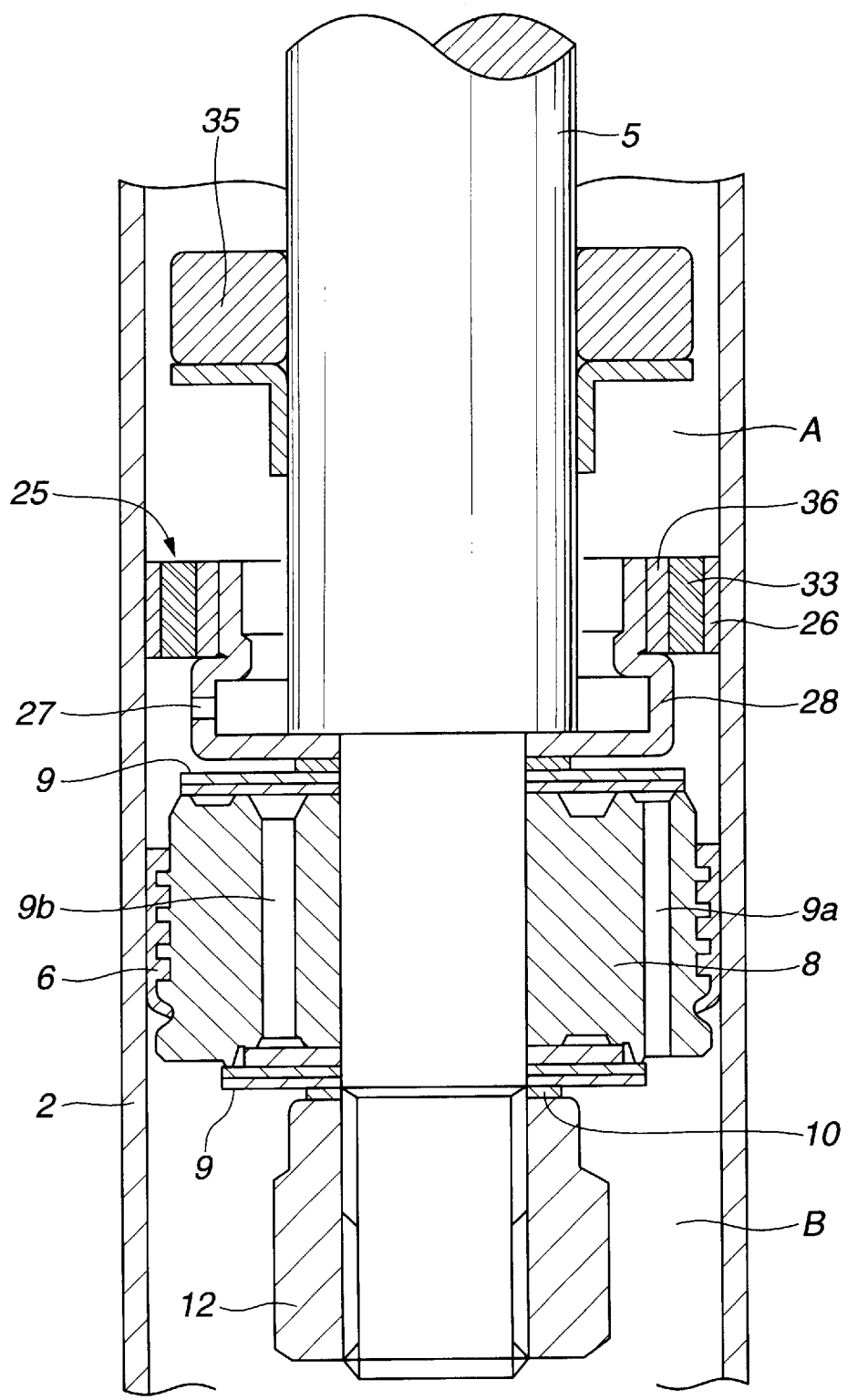
FIG. 44 is a view similar to FIG. 43, showing a thirtieth embodiment of the preset invention.

FIG. 44 shows a thirtieth embodiment of the hydraulic damper 1, wherein the friction member 25 is disposed above the piston 8 and distant therefrom in the same way as in the twenty-ninth embodiment, but the friction member 25 has a triplex integral structure comprising an inner ring 36 mounted to the metal ring 28, a friction element 26 of a resin material abutting on the outer peripheral face of the cylinder 2, and an elastic ring 33 of elastic rubber material interposed between the inner ring 36 and the friction element 26. The elastic ring 33 provides radial elasticity and axial viscoelasticity.

Figure 45:
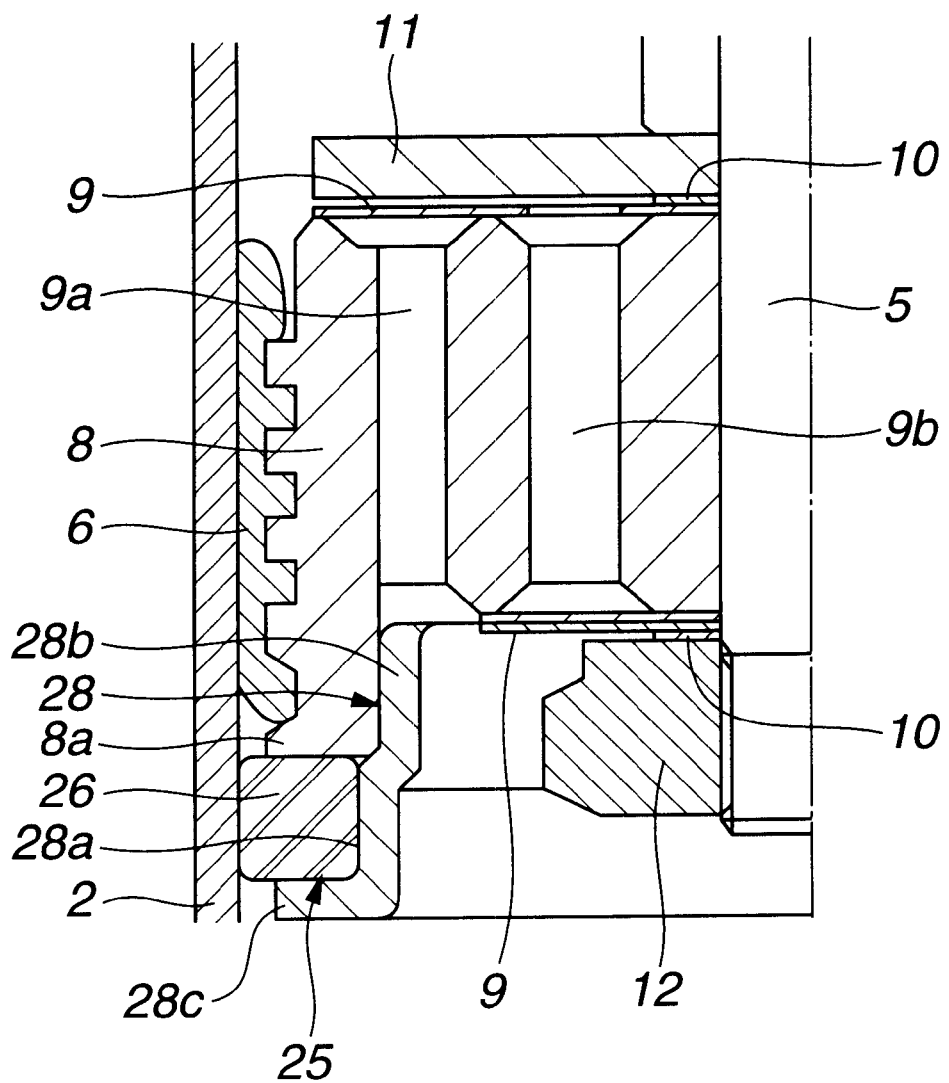
FIG. 45 is a view similar to FIG. 44, showing a thirty-first embodiment of the preset invention.

FIG. 45 shows a thirty-first embodiment of the hydraulic damper 1, wherein the friction member 25 is disposed below the piston 8 and close thereto. The friction member 25 is engaged with an engagement groove 28a defined by a skirt 8a formed at the outer periphery of the lower end of the piston 8 and the metal ring 28. Thus, the friction member 25 has inner periphery secured to the outer peripheral face of the metal ring 28, and outer peripheral face slidably elastically contacting the inner peripheral face of the cylinder 2 at a predetermined pressure.

The metal ring 28 has an upper portion 28b secured to the inner peripheral face of the skirt 8a, and a lower end formed with a bend 28c extending outwardly. The bend 28c of the metal ring 28 and the lower end face of the skirt 8a cooperate to define the engagement groove 28a for receiving the friction member 25.

Figure 46:
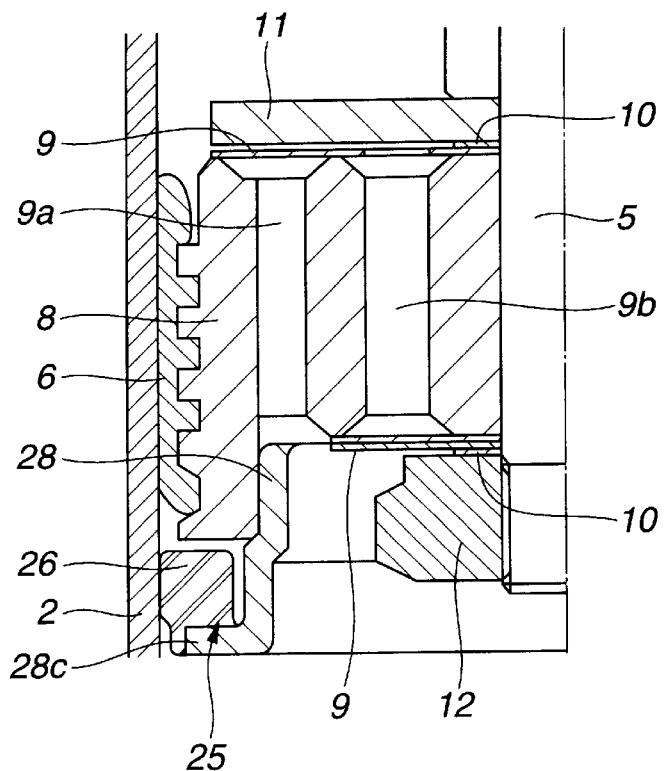
FIG. 46 is a view similar to FIG. 45, showing a thirty-second embodiment of the preset invention.

FIG. 46 shows a thirty-second embodiment of the hydraulic damper 1, wherein the inner periphery of the lower end of the annular friction element 26 of elastic rubber material is cured and bonded to the outer peripheral face to the top face of the bend 28c of the metal ring 28. Thus, the friction element 26 has inner periphery of the lower end secured to the bend 28c, and outer peripheral face slidably elastically contacting the inner peripheral face of the cylinder 2 at a predetermined pressure.

That is, the thirty-second embodiment differs from the thirty-first embodiment in that the friction element 26 can radially be distorted with its portion bonded to the bend 28c as a fulcrum.

Figure 47:
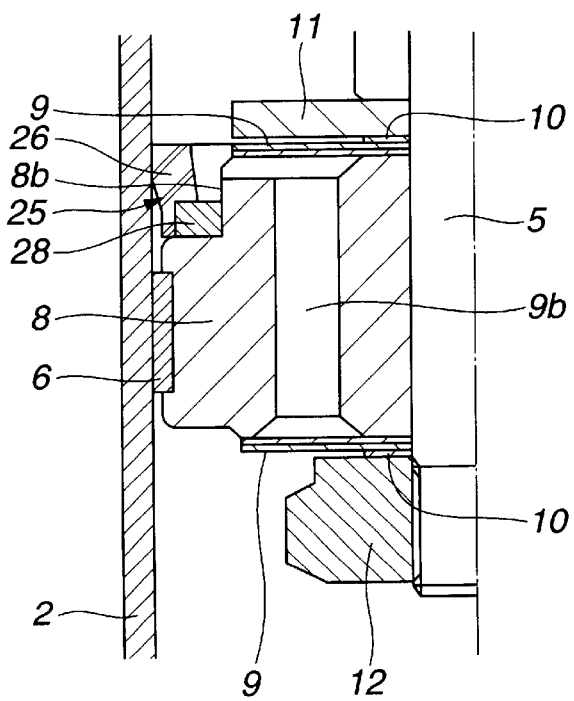
FIG. 47 is a view similar to FIG. 46, showing a thirty-third embodiment of the preset invention.

FIG. 47 shows a thirty-third embodiment of the hydraulic damper 1, wherein the friction member 25 is arranged on the outer peripheral face of the upper end of the piston 8. Specifically, the inner periphery of the lower end of the friction element 26 is cured and bonded to the outer peripheral face to the top face of the metal ring 28. Thus, the friction element 26 has inner periphery of the lower end secured to the metal ring 28, and outer peripheral face slidably elastically contacting the inner peripheral face of the cylinder 2 at a predetermined pressure to provide a given friction to the slide movement of the piston 8. The metal ring 28 has inner periphery secured to a smaller-diameter portion 8b of the piston 8.

Figure 48:
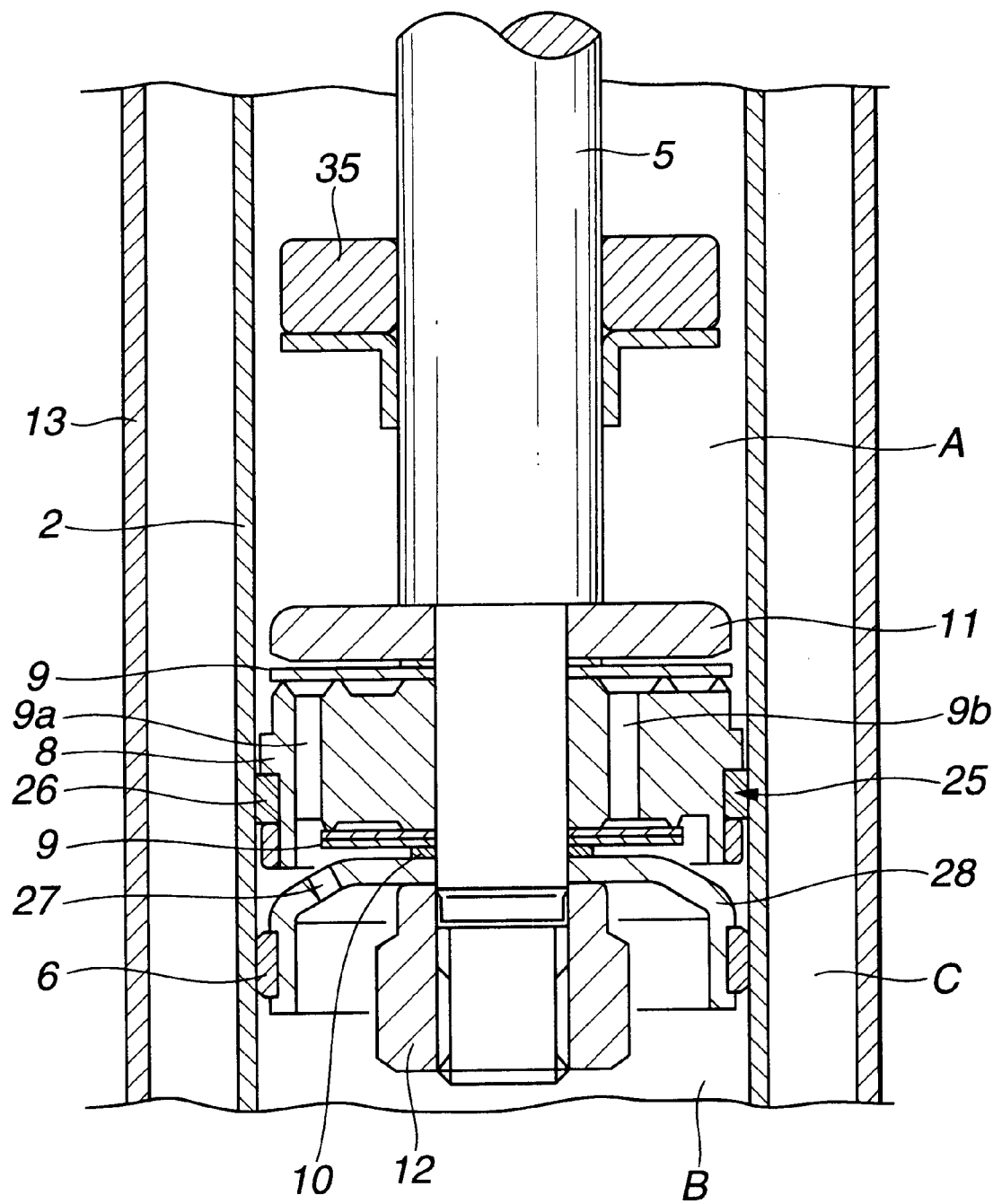
FIG. 48 is a view similar to FIG. 47, showing a thirty-fourth embodiment of the preset invention.

FIG. 48 shows a thirty-fourth embodiment of the hydraulic damper 1, which is substantially the same as the twenty-sixth embodiment except that thy piston ring 6 and the friction member 25 are arranged in an inverted position. Specifically, the friction element 26 of elastic rubber material is secured to the outer peripheral face of the piston 8, whereas the piston ring 6 is secured to the outer periphery of the lower portion of the metal ring 28 disposed on the lower side of the piston 8.

Figure 49:
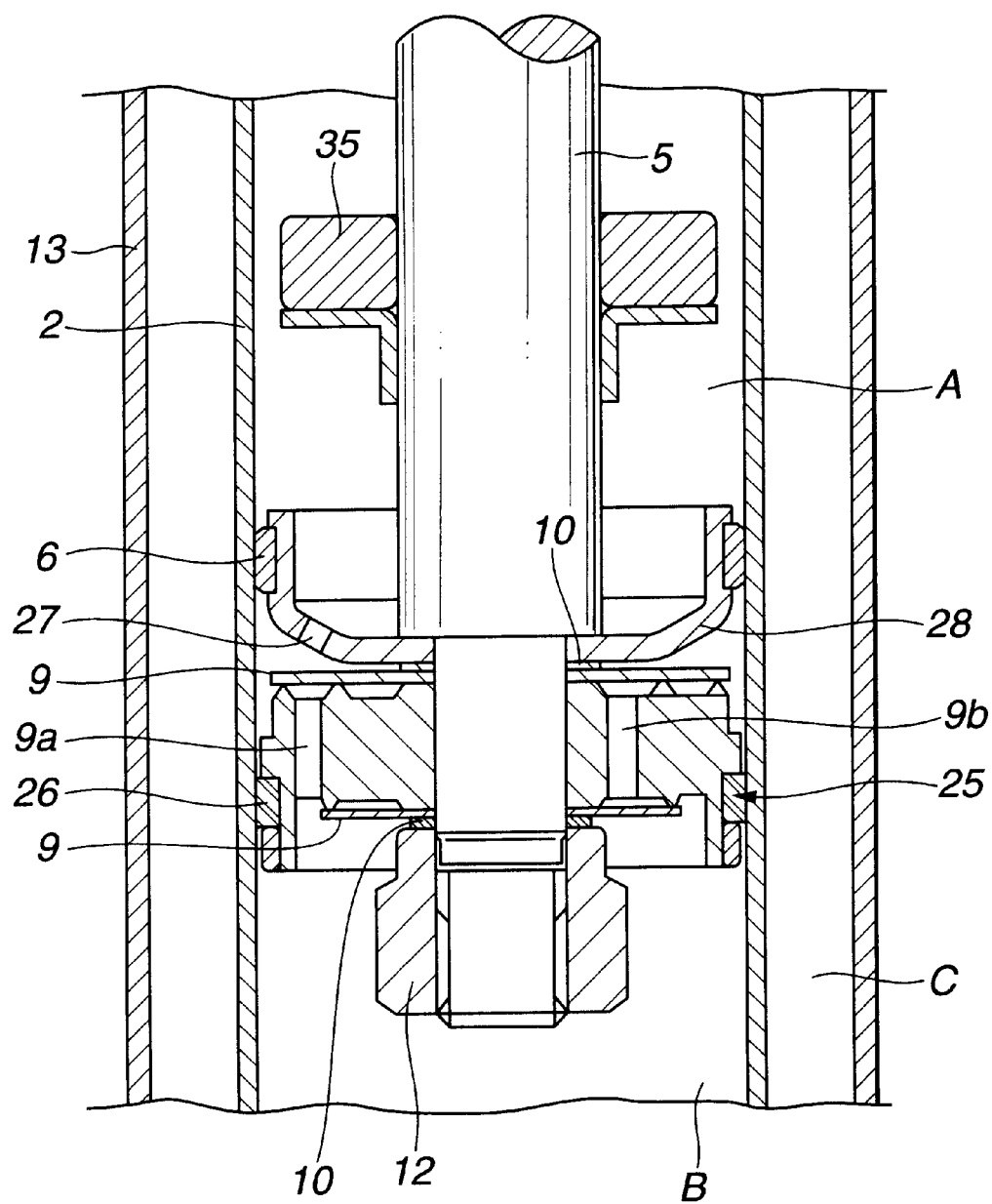
FIG. 49 is a view similar to FIG. 48, showing a thirty-fifth embodiment of the preset invention.

FIG. 49 shows a thirty-fifth embodiment of the hydraulic damper 1, which is substantially the same as the twenty-seventy embodiment except that the piston ring 6 and the friction member 25 are arranged in an inverted position. Specifically, the friction element 26 of elastic rubber material is secured to the outer peripheral face of the piston 8, whereas the piston ring 6 is secured to the outer periphery of the upper portion of the metal ring 28 disposed on the upper side of the piston 8.

Having described the present invention with regard to the preferred embodiments, it is understood that the present invention is not limited thereto, and various changes and modifications can be made without departing from the scope of the present invention. By way of example, in the illustrative embodiments, the friction member 25 is mounted to the piston 8 through the metal ring 28. Optionally, the friction member 25 may directly be engaged with an engagement groove formed in the piston 8.

The entire contents of Japanese Patent Applications P 2000-074838 and P 2000-273402 are incorporated hereby by reference.

What is claimed is:

1. A hydraulic damper, comprising:
   a cylinder filled with hydraulic fluid;
   a piston slidably received in the cylinder through a piston ring;
   a piston rod having one end mounted to the piston and another end extending outwardly of the cylinder;
   a guide bush arranged on the side of the cylinder to slidably support the another end of the piston rod;
   a seal member arranged outwardly with respect to the guide bush, the seal member slidably contacting the piston rod to prevent leakage of hydraulic fluid from the cylinder, the seal member comprising a lip portion; and
   a friction member arranged inwardly with respect to the seal member, the friction member being fixed to one of the cylinder or the piston rod, the friction member slidably contacting an other of the cylinder and the piston rod to produce friction greater than that produced at the seal member;
   a communicating passage for equalizing a pressure acting on both axial sides of the friction member, the communicating passage extending at least in part, in a same horizontal plane as the friction member, radially apart from a contacting surface where the friction member slidably contacts the other of the cylinder and the piston rod.

2. The hydraulic damper as claimed in claim 1, wherein the friction member comprises an elastic element which produces an elastic reaction force to radially bias the friction member so as to always slidably contact the another of the cylinder and the piston rod.

3. The hydraulic damper as claimed in claim 2, wherein the elastic element of the friction member has both radial elasticity and axial viscoelasticity.

4. The hydraulic damper as claimed in claim 2, wherein the friction member is arranged on the side of the cylinder in the vicinity of the guide bush to produce friction greater than that produced at the guide bush.

5. The hydraulic damper as claimed in claim 3, wherein the elastic element of the friction member has an inner diameter tapered toward an end before mounted to the piston rod, and includes at the end a low-rigidity portion having greater taper angle.

6. The hydraulic damper as claimed in claim 3, wherein the elastic element of the friction member is integrated with an upper end of an inner-diameter portion of a rod guide for guiding axial movement of the piston rod at an upper end of the cylinder.

7. The hydraulic damper as claimed in claim 3, wherein the friction element of the friction member comprises at least part of the guide bush.

8. The hydraulic damper as claimed in claim 3, wherein the friction element of the friction member is integrated with the lip portion of the seal member.

9. The hydraulic damper as claimed in claim 2, wherein the friction member produces friction greater than that produced at the piston ring.

10. The hydraulic damper as claimed in claim 2, wherein the friction member produces an axial dynamic spring constant which is set to vary with an axial operating amplitude of the piston rod in such a way as to at least be equal to or greater than 50 N/mm when the axial operating amplitude is smaller than ±0.1 mm, and be smaller than 50 N/mm when the axial operating amplitude is equal to or greater than ±0.5 mm.

11. The hydraulic damper of claim 1, wherein the friction member is fixed to the cylinder, and the communicating passage extending radially outside of a contacting surface where the friction member slidably contacts the piston.

12. The hydraulic damper as claimed in claim 11, further comprising a rod guide having an axial concave surface on its upper surface, the friction member extending into the concave surface of the rod guide.

13. The hydraulic damper as claimed in claim 12, wherein the communicating passage is formed radially between the rod guide and the friction member.

14. The hydraulic damper as claimed in claim 13, wherein the communicating passage is formed in part by the concave surface of the rod guide.

15. The hydraulic damper as claimed in claim 12, wherein the friction member comprises a friction element made of elastic rubber material and a metal ring, the metal ring is arranged on the concave surface of the rod guide, the elastic material is arranged at an inside of the metal ring.

16. The hydraulic damper as claimed in claim 15, wherein the friction element and the metal ring define a ring shaped oil-retaining chamber therebetween.

17. The hydraulic damper as claimed in claim 11, further comprising a one-way valve arranged outwardly with respect to the friction member for allowing hydraulic-fluid flow from an upper side of the friction member to a lower side of the friction member.

18. The hydraulic damper as claimed in claim 17, the one-way valve is formed with the seal member.

19. The hydraulic damper of claim 1, wherein the friction member is fixed to the piston rod, and the communicating passage extending radially inside of a contacting surface where the friction member slidably contacts the cylinder.

20. The hydraulic damper as claimed in claim 19, wherein the friction member comprises a friction element made of elastic rubber material and a metal ring, the metal ring is fixed to the piston rod, the elastic material is arranged at an outside of the metal ring.

21. The hydraulic damper as claimed in claim 20, wherein the metal ring has an opening that defines a part of the communicating passage.

22. The hydraulic damper as claimed in claim 20, wherein the metal ring is axially connected to the piston.

23. The hydraulic damper as claimed in claim 19, wherein the friction member is arranged adjacent to the piston, and the communicating passage is formed in the piston.

\* \* \* \* \*